United States Patent
O'Hara et al.

(10) Patent No.: US 11,431,377 B1
(45) Date of Patent: Aug. 30, 2022

(54) METHODS AND TUNABLE APPARATUSES FOR DYNAMIC DISPERSION COMPENSATION OF WIRELESS TERAHERTZ SIGNALS

(71) Applicant: THE BOARD OF REGENTS FOR THE OKLAHOMA AGRICULTURAL AND MECHANICAL COLLEGES, Stillwater, OK (US)

(72) Inventors: John F. O'Hara, Stillwater, OK (US); Karl Louthan Strecker, Stillwater, OK (US)

(73) Assignee: The Board of Regents for the Oklahoma Agricultural and Mechanical Colleges, Stillwater, OK (US)

( * ) Notice: Subject to any disclaimer, the term of this patent is extended or adjusted under 35 U.S.C. 154(b) by 0 days.

(21) Appl. No.: 17/016,944

(22) Filed: Sep. 10, 2020

Related U.S. Application Data

(60) Provisional application No. 63/052,169, filed on Jul. 15, 2020, provisional application No. 62/898,358, filed on Sep. 10, 2019.

(51) Int. Cl.
  *H04B 1/719* (2011.01)
  *H04B 1/7163* (2011.01)
  *H04B 1/717* (2011.01)

(52) U.S. Cl.
  CPC ......... *H04B 1/719* (2013.01); *H04B 1/7174* (2013.01); *H04B 1/71632* (2013.01); *H04B 1/71635* (2013.01); *H04B 1/71637* (2013.01)

(58) Field of Classification Search
  CPC ........... G02B 6/29394; G02B 6/12007; G02B 6/29395; G02B 6/29358; G02B 6/124;
  (Continued)

(56) References Cited

U.S. PATENT DOCUMENTS

| 5,734,503 A | 3/1998 | Szipocs et al. |
| 6,590,925 B1 | 7/2003 | Kaertner et al. |

(Continued)

OTHER PUBLICATIONS

Wells, J. "Faster than fiber: The future of multi-G/s wireless." IEEE Microwave Magazine 10, 104-112, https://doi.org/10.1109/mmm.2009.932081 2009.

(Continued)

*Primary Examiner* — Golam Sorowar
(74) *Attorney, Agent, or Firm* — McAfee & Taft, A Professional Corporation

(57) ABSTRACT

In ultra-wideband or impulse radio terahertz wireless communication, the atmosphere reshapes terahertz pulses via group delay dispersion (GDD). Without correction, this can degrade the achievable data transmission rate. An apparatus comprising a stratified structure having a front end and a back end is disclosed. The structure comprises a plurality of adjacent layers of differing refractive indices, wherein each layer has a refractive index different from an immediately adjacent layer. The structure further includes a backing layer at the back end. The structure defines a GDD, which can be adjusted, and the structure is configured to introduce the GDD to a received terahertz signal and thereby produce a compensated terahertz signal when the received terahertz signal is reflected by the structure. The GDD of the structure is configured to substantially cancel out the GDD effects caused by the atmosphere on the terahertz signal.

59 Claims, 12 Drawing Sheets

(58) Field of Classification Search
CPC ............ G02B 6/29398; G02B 6/29343; G02B 6/122; G02B 6/29325; G02B 6/29361; G02B 26/001; G02B 6/29383; G02B 6/32; G02B 6/02085; G02B 6/10; G02B 6/24; G02B 1/115; G02B 2006/02166; G02B 2006/12147; G02B 21/16; H01S 3/0057; H01S 3/0092; H01S 3/1608; H01S 3/0078; H01S 3/1618; H01S 2302/02; H01S 3/0085; H01S 3/1118; H01S 5/14; H01S 5/3402; H01S 3/17; H01S 5/0625; H01S 5/0657; H01S 5/1021; H01S 5/1025; H01S 5/142; H01S 5/22; H01S 2301/08; H01S 2302/00; H01S 3/0604; H04B 10/2531; H04B 10/2519; H04B 10/2581; H04B 10/299; H04B 10/615; H04B 10/67; H04B 15/00; H04B 2210/003

See application file for complete search history.

(56) References Cited

U.S. PATENT DOCUMENTS

| | | | |
|---|---|---|---|
| 7,826,504 B2 | 11/2010 | Chen et al. | |
| 9,960,849 B1* | 5/2018 | Dogiamis | H04B 10/2575 |
| 2002/0196549 A1* | 12/2002 | Randall | G02B 6/29394 |
| | | | 359/578 |
| 2005/0074206 A1* | 4/2005 | Domash | G02B 6/29395 |
| | | | 385/27 |
| 2008/0212161 A1* | 9/2008 | Valette | G02B 3/14 |
| | | | 359/291 |
| 2012/0134008 A1* | 5/2012 | Bita | G02B 26/001 |
| | | | 359/295 |
| 2013/0314765 A1* | 11/2013 | Padilla | G01K 7/003 |
| | | | 359/315 |
| 2016/0241690 A1* | 8/2016 | Sim | H04B 15/02 |

OTHER PUBLICATIONS

Cherry, S. "Edholm's law of bandwidth." IEEE Spectrum 41, 58-60, https://doi.org/10.1109/mspec.2004.1309810 (2004).

Song, H.-J. & Nagatsuma, T. "Present and future of terahertz communications." IEEE Transactions on Terahertz Science and Technology 1, 256-263, https://doi.org/10.1109/tthz.2011.2159552 (2011).

Ma, J., Shrestha, R., Moeller, L. & Mittleman, D. M. "Invited article: Channel performance for indoor and outdoor terahertz wireless links." APL Photonics 3, 051601, https://doi.org/10.1063/1.5014037 (2018).

"Global mobile data traffic forecast update, 2017-2022." https://www.cisco.com/c/en/us/solutions/collateral/service-provider/visualnetworking-index-vni/white-paper-c11-738429.html (2019). Accessed: Jul. 22, 2019 2019.

Dastjerdi, A. V. & Buyya, R. "Fog computing: Helping the internet of things realize its potential." Computer 49, 112-116, https://doi.org/10.1109/mc.2016.245 (2016).

Cortés, R., Bonnaire, X., Marin, O. & Sens, P. "Stream processing of healthcare sensor data: Studying user traces to identify challenges from a big data perspective." Procedia Computer Science 52, 1004-1009, https://doi.org/10.1016/j.procs.2015.05.093 (2015).

Mumtaz, S. et al. "Terahertz communication for vehicular networks." IEEE Transactions on Vehicular Technology 66, 5617-5625, https://doi.org/10.1109/TVT.2017.2712878 (2017).

Chen, Z. et al. "A survey on terahertz communications." China Communications 16, 1-35 (Feb. 2019).

Yang, Y., Mandehgar, M. & Grischkowsky, D. R. "Broadband THz pulse transmission through the atmosphere." IEEE Transactions on Terahertz Science and Technology 1, 264-273, https://doi.org/10.1109/TTHZ.2011.2159554 (2011).

Harde, H., Cheville, R. A. & Grischkowsky, D. "Terahertz studies of collision-broadened rotational lines." The Journal of Physical Chemistry A 101, 3646-3660, https://doi.org/10.1021/jp962974c (1997).

Yang, Y., Mandehgar, M. & Grischkowsky, D. "Determination of the water vapor continuum absorption by THz-TDS and Molecular Response Theory." Opt. Express 22, 4388-4403, https://doi.org/10.1364/OE.22.004388 (2014).

Xin, X., Altan, H., Saint, A., Matten, D. & Alfano, R. R. "Terahertz absorption spectrum of para and ortho water vapors at different humidities at room temperature." Journal of Applied Physics 100, 094905, https://doi.rg/10.1063/1.2357412 (2006).

Hill, R. J. "Dispersion by atmospheric water vapor at frequencies less than 1 THz." IEEE Transactions on Antennas and Propagation 36, 423-430, https://doi.org/10.1109/8.192126 (1988).

Mandehgar, M., Yang, Y. & Grischkowsky, D. "Experimental confirmation and physical understanding of ultra-high bit rate impulse radio in the THz digital communication channels of the atmosphere." Journal of Optics 16, 094004, https://doi.org/10.1088/2040—2014.

Wu, Q. et al. A 21 _m 5 Gbps real time wireless communication system at 0.14 THz. In 2017 42nd International Conference on Infrared, Millimeter, and Terahertz Waves (I_MMW-THz), 1-2, https://doi.org/10.1109/I_MMW-THz.2017.8066870 (2017).

Hirata, A. et al. "5.8-km 10-Gbps data transmission over a 120-GHz-band wireless link." In 2010 IEEE International Conference on Wireless Information Technology and Systems, 1-4, https://doi.org/10.1109/ICWITS.2010.5611945 (2010).

Wang, C., Changxing Lin, Qi Chen, Xianjin Deng & Jian Zhang. "0.14 THz high speed data communication over 1.5 kilometers." In 2012 37th International Conference on Infrared, Millimeter, and Terahertz Waves, 1-2, https://doi.org/10.1109/I_MMWTHz.2012.6380109 (2012).

Ducournau, G. et al. "Ultrawide-bandwidth single-channel 0.4-THz wireless link combining broadband quasi-optic photomixer and coherent detection." IEEE Transactions on Terahertz Science and Technology 4, 328-337, https://doi.org/10.1109/TTHZ.2014.2309006 (2014).

Antes, J. et al. "220 GHz wireless data transmission experiments up to 30 gbit/s." In 2012 IEEE/MTT-S International Microwave Symposium Digest, 1-3, https://doi.org/10.1109/MWSYM.2012.6259561 (2012).

Ducournau, G. et al. "THz communications using photonics and electronic devices: the race to data-rate." Journal of Infrared, Millimeter, and Terahertz Waves 36, 198-220, https://doi.org/10.1007/s10762-014-0112-x (2015).

Mandehgar, M., Yang, Y. & Grischkowsky, D. "Atmosphere characterization for simulation of the two optimal wireless terahertz digital communication links." Opt. Lett. 38, 3437-3440, https://doi.org/10.1364/OL.38.003437 (2013).

Mandehgar, M. & Grischkowsky, D. R. "Understanding dispersion compensation of the THz communication channels in the atmosphere." IEEE Photonics Technology Letters 27, 2387-2390, https://doi.org/10.1109/LPT.2015.2466559 (2015).

O'Hara, J. F. & Grischkowsky, D. R. "Comment on the veracity of the ITU-R recommendation for atmospheric attenuation at terahertz frequencies." IEEE Transactions on Terahertz Science and Technology 8, 372-375, https://doi.org/10.1109/TTHZ.2018.2814343 (2018).

Van Exter, M. & Grischkowsky, D. R. "Characterization of an optoelectronic terahertz beam system." IEEE Transactions on Microwave Theory and Techniques 38, 1684-1691, https://doi.org/10.1109/22.60016 (1990).

Gordon, I. et al. The HITRAN2016 molecular spectroscopic database. Journal of Quantitative Spectroscopy and Radiative Transfer 203, 3-69, https://doi.org/10.1016/j.jqsrt.2017.06.038 (2017).

Y. Qi et al., "Quantifying data rate and bandwidth requirements for immersive 5G experience," in 2016 IEEE International Conference on Communications Workshops (ICC), Kuala Lumpur, 2016.

D. M. Slocum et al., "Terahertz atmospheric attenuation and continuum effects," in Proceedings of SPIE vol. 8716, Terahertz Physics, Devices, and Systems VII: Advanced Applications in Industry and Defense, Baltimore, Maryland, 2013.

(56) References Cited

OTHER PUBLICATIONS

G. A. Siles, J. M. Riera and P. Garcia-del-Pino, "Atmospheric Attenuation in Wireless Communication Systems at Millimeter and THz Frequencies [Wireless Corner]," IEEE Antennas and Propagation Magazine, vol. 57, No. 1, pp. 48-61, 2015.

Y. Yang, A. Shutler and D. Grischkowsky, "Measurement of the transmission of the atmosphere from 0.2 to 2 THz," Optics Express, vol. 19, No. 9, pp. 8830-8838, 2011.

T. Yuan et al., "Terahertz time-domain spectroscopy of atmosphere with different humidity," in Proceedings of SPIE vol. 5070, Terahertz for Military and Security Applications, Orlando, Florida, 2003.

Y. Yang, M. Mandehgar and D. Grischkowsky, "Understanding THz Pulse Propagation in the Atmosphere," IEEE Transactions on Terahertz Science and Technology, vol. 2, No. 4, pp. 406-415, 2012.

N. Matuschek, F. Kartner and U. Keller, "Theory of double-chirped mirrors," IEEE Journal of Selected Topics in Quantum Electronics, vol. 4, No. 2, pp. 197-208, 1998.

H. Nyquist, "Certain Topics in Telegraph Transmission Theory," Transactions of the American Institute of Electrical Engineers, vol. 47, No. 2, pp. 617-644, 1928.

M. Mandehgar and D. R. Grischkowsky, "Understanding Dispersion Compensation of the THz Communication Channels in the Atmosphere," IEEE Photon. Technol. Lett., vol. 27, No. 22, pp. 2387-2390, Sep. 2015 Sep. 2015.

D. Grischkowsky, M. Mandehgar, and Y. Yang, "Time domain measurement of the THz refractivity of water vapor," Opt. Express, vol. 20, No. 24, pp. 26208-26218, Nov. 2012.

X. G. Peralta, E. I. Smirnova, A. K. Azad, H. Chen, A. J. Taylor, I. Brener, and J. F. O'Hara, "Metamaterials for THz polarimetric devices," Opt. Express, vol. 17, No. 2, pp. 773-783, Jan. 2009.

H.-T. Chen, J. F. O'Hara, A. K. Azad, A. J. Taylor, R. D. Averitt, D. B. Shrekenhamer, and W. J. Padilla, "Experimental demonstration of frequency-agile terahertz metamaterials," Nature Photon, vol. 2, No. 5, pp. 295-298, Apr. 2008.

Y. Zhang, T. Li, Q. Chen, H. Zhang, J. F. O'Hara, E. Abele, A. J. Taylor, H.-T. Chen, and A. K. Azad, "Independently tunable dual-band perfect absorber based on graphene at mid-infrared frequencies," Scientific Reports, vol. 5, No. 1, pp. 18463:1-8, Dec. 2015.

J. F. O'Hara, R. Singh, I. Brener, E. Smirnova, J. Han, A. J. Taylor, and W. Zhang, "Thin-film sensing with planar terahertz metamaterials: sensitivity and limitations," Opt. Express, vol. 16, No. 3, pp. 1786-1795, Feb. 2008.

J. F. O'Hara, W. Withayachumnankul, and I. Al-Naib, "A Review on Thin-film Sensing with Terahertz Waves," J Infrared Milli Terahz Waves, vol. 33, No. 3, pp. 245-291, Mar. 2012.

H.-T. Chen, J. Zhou, J. F. O'Hara, F. Chen, A. K. Azad, and A. J. Taylor, "Antireflection Coating Using Metamaterials and Identification of Its Mechanism," Phys. Rev. Lett., vol. 105, No. 7, p. 073901, Aug. 2010.

J. Zhou, H.-T. Chen, T. Koschny, A. K. Azad, A. J. Taylor, C. M. Soukoulis, and J. F. O'Hara, "Application of metasurface description for multilayered metamaterials and an alternative theory for metamaterial perfect absorber," arXiv.org, vol. 1111. p. arXiv:1111.0343, Nov. 2011.

J. Zhou, D. Roy Chowdhury, R. Zhao, A. K. Azad, H.-T. Chen, C. M. Soukoulis, A. J. Taylor, and J. F. O'Hara, "Terahertz chiral metamaterials with giant and dynamically tunable optical activity," Phys. Rev. B, vol. 86, No. 3, pp. 035448-6, Jul. 2012.

J. O'Hara, A. K. Azad, and A. J. Taylor, "A method to determine effective metamaterial properties based on stratified metafilms," Eur. Phys. J. D, vol. 58, No. 2, pp. 243-247, May 2010.

J. Heppner and J. Kuhl, "Intracavity chirp compensation in a colliding pulse mode-locked laser using thin-film interferometers," Appl. Phys. Lett., vol. 47, No. 5, pp. 453-455, Jun. 1998.

M. Dems, P. Wnuk, P. Wasylczyk, Ł. Zinkiewicz, A. Wójcik-Jedlińska, K. Regiński, K. Hejduk, and A. Jasik, "Optimization of broadband semiconductor chirped mirrors with genetic algorithm," Appl. Phys. B, vol. 122, No. 10, pp. 1-6, Oct. 2016.

D. Liu, Y. Tan, E. Khoram, and Z. Yu, "Training Deep Neural Networks for the Inverse Design of Nanophotonic Structures," ACS Photonics, Feb. 2018.

A. I. Mabilangan, L. P. Lopez Jr, M. A. B. Faustino, J. E. Muldera, N. I. F. Cabello, E. S. Estacio, A. A. Salvador, and A. S. Somintac, "Porosity dependence of terahertz emission of porous silicon investigated using reflection geometry terahertz time-domain spectroscopy," Superlattices and Microstructures, vol. 100, No. C, pp. 892-899, Dec. 2016.

P. Wnuk, P. Wasylczyk, Ł. Zinkiewicz, M. Dems, K. Hejduk, K. Regiński, A. Wójcik-Jedlińska, and A. Jasik, "Continuously tunable Yb:KYW femtosecond oscillator based on a tunable highly dispersive semiconductor mirror," Opt. Express, vol. 22, No. 15, pp. 18284-18286, 2014.

F. Zhou, W. Cao, B. Dong, T. Reissman, W. Zhang, and C. Sun, "Additive Manufacturing of a 3D Terahertz Gradient-Refractive Index Lens," Advanced Optical Materials, vol. 4, No. 7, pp. 1034-1040, Jul. 2016.

J. Zhu, Y. Chen, X. Zhu, F. J. Garcia-Vidal, X. Yin, W. Zhang, and X. Zhang, "Acoustic rainbow trapping," Sci. Rept., vol. 3, p. 1728, Apr. 2013.

Z. Zhu, X. Zhang, J. Gu, R. Singh, Z. Tien, J. Han, and W. Zhang, "A Metamaterial-Based Terahertz Low-Pass Filter With Low Insertion Loss and Sharp Rejection," IEEE Transactions on Terahertz Science and Technology, vol. 3, No. 6, pp. 832-837, Nov. 2013.

Martin van Exter and Daniel R. Grischowsky, "Characterization of an Optoelectronic Terahertz Beam System", IEE Transactions on Microwave Theor and Techniques, Nov. 1990.

Y. Yang, M. Mandehgar and D. Grischkowsky, "THz-TDS Characterization of the Digital Communication Channels of the Atmosphere and the Enabled Applications," Journal of Infrared, Millimeter, and Terahertz Waves, vol. 36, pp. 977-129, 2015.

B. Golubovic, R. R. Austin, M. K. Steiner-Shepard, M. K. Reed, S. A. Diddams, D. J. Jones, and A. G. Van Engen, "Double Gires-Tournois interferometer negative-dispersion mirrors for use in tunable mode-locked lasers," Opt. Lett., OL, vol. 25, No. 4, pp. 275-277, 2000.

R. Mendis, M. Nagai, Y. Wang, N. Karl, and D. M. Mittleman, "Terahertz Artificial Dielectric Lens," Sci. Rept., vol. 6, No. 1, pp. 1-8, Mar. 2016.

W. Cao, C. Song, T. E. Lanier, R. Singh, J. F. O'Hara, W. M. Dennis, Y. Zhao, and W. Zhang, "Tailoring terahertz plasmons with silver nanorod arrays," Sci. Rept., vol. 3, No. 1, p. 1766, May 2013.

F. Hu, N. Xu, W. Wang, Y. Wang, W. Zhang, J. Han, and W. Zhang, "A dynamically tunable terahertz metamaterial absorber based on an electrostatic MEMS actuator and electical dipole resonator array," J. Micromech. Microeng., vol. 26, No. 2, p. 025006, Feb. 2016.

I. Al-Naib, Y. Yang, M. M. Dignam, W. Zhang, and R. Singh, "Ultra-high Q even eigenmode resonance in terahertz metamaterials," Appl. Phys. Lett., vol. 106, No. 1, p. 011102, Jan. 2015.

W. Cao, R. Singh, C. Zhang, J. Han, M. Tonouchi, and W. Zhang, "Plasmon-induced transparency in metamaterials: Active near field coupling between bright superconducting and dark metallic mode resonators," Appl. Phys. Lett., vol. 103, No. 10, p. 101106, Sep. 2013.

L. Cong, W. Cao, Z. Tian, J. Gu, J. Han, and W. Zhang, "Manipulating polarization states of terahertz radiation using metamaterials," New J. Phys., vol. 14, No. 11, p. 115013, Nov. 2012.

L. Cong, W. Cao, X. Zhang, Z. Tian, J. Gu, R. Singh, J. Han, and W. Zhang, "A perfect metamaterial polarization rotator," Appl. Phys. Lett., vol. 103, No. 17, p. 171107, Oct. 2013.

L. Cong, J. Gu, Z. Tian, R. Singh, J. Han, and W. Zhang, "Manipulating the polarization of terahertz waves with metamaterial devices," Journal of Molecular and Engineering Materials, vol. 2, No. 2, p. 1440008, Aug. 2014.

L. Cong, M. Manjappa, N. Xu, I. Al-Naib, W. Zhang, and R. Singh, "Fano Resonances in Terahertz Metasurfaces: A Figure of Merit Optimization," Advanced Optical Materials, vol. 3, No. 11, pp. 1537-1543, Nov. 2015.

L. Cong, S. Tan, R. Yahiaoui, F. Yan, W. Zhang, and R. Singh, "Experimental demonstration of ultrasensitive sensing with terahertz metamaterial absorbers: A comparison with the metasurfaces," Appl. Phys. Lett., vol. 106, No. 3, p. 031107, Jan. 2015.

(56) References Cited

OTHER PUBLICATIONS

L. Cong, N. Xu, J. Gu, R. Singh, J. Han, and W. Zhang, "Highly flexible broadband terahertz metamaterial quarter-wave plate," Laser & Photonics Reviews, vol. 8, No. 4, pp. 626-632, Jul. 2014.
L. Cong, N. Xu, J. Han, W. Zhang, and R. Singh, "A Tunable Dispersion-Free Terahertz Metadevice with Pancharatnam-Berry-Phase-Enabled Modulation and Polarization Control," Adv. Mater., vol. 27, No. 42, pp. 6630-6636, Nov. 2015.
L. Cong, N. Xu, D. Roy Chowdhury, M. Manjappa, C. Rockstuhl, W. Zhang, and R. Singh, "Nonradiative and Radiative Resonances in Coupled Metamolecules," Advanced Optical Materials, vol. 4, No. 2, pp. 252-258, Feb. 2016.
L. Cong, N. Xu, W. Zhang, and R. Singh, "Polarization Control in Terahertz Metasurfaces with the Lowest Order Rotational Symmetry," Advanced Optical Materials, vol. 3, No. 9, pp. 1176-1183, Sep. 2015.
J. Ding, N. Xu, H. Ren, Y. Lin, W. Zhang, and H. Zhang, "Dual-Wavelength Terahertz Metasurfaces with Independent Phase and Amplitude Control at Each Wavelength," Sci. Rept., vol. 6, No. 1, pp. 34020-1-9, Sep. 2016.
J. Gu, R. Singh, X. Liu, X. Zhang, Y. Ma, S. Zhang, S. A. Maier, Z. Tian, A. K. Azad, H.-T. Chen, A. J. Taylor, J. Han, and W. Zhang, "Active control of electromagnetically induced transparency analogue in terahertz metamaterials," Nature, vol. 3, pp. 1151-1156, Oct. 2012.
Y. K. Srivastava, M. Manjappa, L. Cong, W. Cao, I. Al-Naib, W. Zhang, and R. Singh, "Ultrahigh-Q Fano Resonances in Terahertz Metasurfaces: Strong Influence of Metallic Conductivity at Extremely Low Asymmetry," Advanced Optical Materials, vol. 4, No. 3, pp. 457-463, Dec. 2015.
M. Lawrence, N. Xu, X. Zhang, L. Cong, J. Han, W. Zhang, and S. Zhang, "Manifestation of PT Symmetry Breaking in Polarization Space with Terahertz Metasurfaces," Phys. Rev. Lett., vol. 113, No. 9, p. 093901, Aug. 2014.
Q. Li, L. Cong, R. Singh, N. Xu, W. Cao, X. Zhang, Z. Tian, L. Du, J. Han, and W. Zhang, "Monolayer graphene sensing enabled by the strong Fano-resonant metasurface," Nanoscale, vol. 8, No. 39, pp. 17278-17284, 2016.
Q. Li, Z. Tian, X. Zhang, R. Singh, L. Du, J. Gu, J. Han, and W. Zhang, "Active graphene-silicon hybrid diode for terahertz waves," Nature, vol. 6, No. 1, p. 7082, May 2015.
Q. Li, Z. Tian, X. Zhang, N. Xu, R. Singh, J. Gu, P. Lu, L.-B. Luo, S. Zhang, J. Han, and W. Zhang, "Dual control of active graphene-silicon hybrid metamaterial devices," Carbon, vol. 90, pp. 146-153, Aug. 2015.
L. Liu, X. Zhang, M. Kenney, X. Su, N. Xu, C. Ouyang, Y. Shi, J. Han, W. Zhang, and S. Zhang, "Broadband Metasurfaces with Simultaneous Control of Phase and Amplitude," Adv. Mater., vol. 26, No. 29, pp. 5031-5036, Aug. 2014.
M. Manjappa, S.-Y. Chiam, L. Cong, A. A. Bettiol, W. Zhang, and R. Singh, "Tailoring the slow light behavior in terahertz metasurfaces," Appl. Phys. Lett., vol. 106, No. 1, p. 181101, May 2015.
D. Roy Chowdhury, A. K. Azad, W. Zhang, and R. Singh, "Near Field Coupling in Passive and Active Terahertz Metamaterial Devices," IEEE Trans. THz Sci. Technol., vol. 3, pp. 783-790, Nov. 2013.
D. Roy Chowdhury, N. Xu, W. Zhang, and R. Singh, "Resonance tuning due to Coulomb interaction in strong near-field coupled metamaterials," J. Appl. Phys., vol. 118, No. 2, pp. 023104-023107, Jul. 2015.
R. Singh, I. Al-Naib, W. Cao, C. Rockstuhl, M. Koch, and W. Zhang, "The Fano Resonance in Symmetry Broken Terahertz Metamaterials," IEEE Trans. THz Sci. Technol., vol. 3, No. 6, pp. 820-826, Nov. 2013.
R. Singh, I. Al-Naib, D. Roy Chowdhury, L. Cong, C. Rockstuhl, and W. Zhang, "Probing the transition from an uncoupled to a strong near-field coupled regime between bright and dark mode resonators in metasurfaces," Appl. Phys. Lett., vol. 105, No. 8, p. 081108, Aug. 2014.

R. Singh, W. Cao, I. Al-Naib, L. Cong, W. Withayachumnankul, and W. Zhang, "Ultrasensitive terahertz sensing with high-Q Fano resonances in metasurfaces," Appl. Phys. Lett., vol. 105, No. 17, pp. 171101-171106, Oct. 2014.
X. Su, C. Ouyang, N. Xu, S. Tan, J. Gu, Z. Tian, J. Han, F. Yan, and W. Zhang, "Broadband Terahertz Transparency in a Switchable Metasurface," IEEE Photonics J., vol. 7, No. 1, pp. 1-8. Feb. 2015.
X. Su, C. Ouyang, N. Xu, S. Tan, J. Gu, Z. Tian, R. Singh, S. Zhang, F. Yan, J. Han, and W. Zhang, "Dynamic mode coupling in terahertz metamaterials," Sci. Rept., vol. 5, p. 10823, Jun. 2015.
D. Wang, Z. Tian, C. Zhang, X. Jia, B. Jin, J. Gu, J. Han, and W. Zhang, "Terahertz superconducting metamaterials for magnetic tunability," J. Opt., vol. 16, No. 9, p. 094013, Sep. 2014.
J. Wang, R. Singh, S. Wang, and W. Zhang, Metamaterial inspired terahertz devices: from ultra-sensitive sensing to near field manipulation, vol. 11, No. 1. Chinese Optical Society, 2013.
Q. Wang, X. Zhang, Y. Xu, Z. Tian, J. Gu, W. Yue, S. Zhang, J. Han, and W. Zhang, "A Broadband Metasurface-Based Terahertz Flat-Lens Array," Advanced Optical Materials, vol. 3, No. 6, pp. 779-785, Jun. 2015.
Q. Wang, X. Zhang, Y. Xu, J. Gu, Y. Li, Z. Tian, R. Singh, S. Zhang, J. Han, and W. Zhang, "Broadband metasurface holograms: toward complete phase and amplitude engineering," Sci. Rept., vol. 6, p. 32867, Sep. 2016.
Z. Wang, K. Kang, S. Wang, L. Li, N. Xu, J. Han, M. He, L. Wu, and W. Zhang, "Determination of plane stress state using terahertz time-domain spectroscopy," Sci. Rept., vol. 6, p. 36308, Nov. 2016.
W. Withayachumnankul, J. F. O'Hara, W. Cao, I. Al-Naib, and W. Zhang, "Limitation in thinfilm sensing with transmission-mode terahertz time-domain spectroscopy," Opt. Express, vol. 22, No. 1, pp. 972-986, 2014.
L. Wu, T. Du, N. Xu, C. Ding, H. Li, Q. Sheng, M. Liu, J. Yao, Z. Wang, X. Lou, and W. Zhang, "A New Ba0.6Sr0.4TiO3-Silicon Hybrid Metamaterial Device in Terahertz Regime," Small, vol. 12, No. 19, pp. 2610-2615, May 2016.
N. Xu, M. Manjappa, R. Singh, and W. Zhang, "Tailoring the Electromagnetically Induced Transparency and Absorbance in Coupled Fano-Lorentzian Metasurfaces: A Classical Analog of a Four-Level Tripod Quantum System," Advanced Optical Materials, vol. 4, No. 8, pp. 1179-1185, Aug. 2016.
N. Xu, R. Singh, and W. Zhang, "High-Q lattice mode matched structural resonances in terahertz metasurfaces," Appl. Phys. Lett., vol. 109, No. 2, p. 021108, Jul. 2016.
Q. Xu, X. Su, C. Ouyang, N. Xu, W. Cao, Y. Zhang, Q. Li, C. Hu, J. Gu, Z. Tian, A. K. Azad, J. Han, and W. Zhang, "Frequency-agile electromagnetically induced transparency analogue in terahertz metamaterials," Opt. Lett., OL, vol. 41, No. 19, pp. 4562-4565, Oct. 2016.
Y. Xu, X. Zhang, Z. Tian, J. Gu, C. Ouyang, Y. Li, J. Han, and W. Zhang, "Mapping the nearfield propagation of surface plasmons on terahertz metasurfaces," Appl. Phys. Lett., vol. 107, No. 2, p. 021105, Jul. 2015.
R. Yahiaoui, S. Tan, L. Cong, R. Singh, F. Yan, and W. Zhang, "Multispectral terahertz sensing with highly flexible ultrathin metamaterial absorber," J. Appl. Phys., vol. 118, No. 8, p. 083103, Aug. 2015.
Q. Yang, J. Gu, D. Wang, X. Zhang, Z. Tian, C. Ouyang, R. Singh, J. Han, and W. Zhang, "Efficient flat metasurface lens for terahertz imaging," Opt. Express, vol. 22, No. 21, pp. 25931-25939, Oct. 2014.
Xueqian Zhang, Quan Li, Wei Cao, Jianqiang Gu, R. Singh, Zhen Tian, Jiaguang Han, and Weili Zhang, "Polarization-Independent Plasmon-Induced Transparency in a Fourfold Symmetric Terahertz Metamaterial," IEEE J. Select. Topics Quantum Electron., vol. 19, No. 1, pp. 8400707-8400707, Feb. 2013.
X. Zhang, Z. Tian, W. Yue, J. Gu, S. Zhang, J. Han, and W. Zhang, "Broadband Terahertz Wave Deflection Based on C-shape Complex Metamaterials with Phase Discontinuities," Adv. Mater., vol. 25, No. 33, pp. 4567-4572, Sep. 2013.
X. Zhang, N. Xu, K. Qu, Z. Tian, R. Singh, J. Han, G. S. Agarwal, and W. Zhang, "Electromagnetically induced absorption in a three-resonator metasurface system," Sci. Rept., vol. 5, p. 10737, May 2015.

(56) References Cited

OTHER PUBLICATIONS

X. Zhang, Q. Xu, Q. Li, Y. Xu, J. Gu, Z. Tian, C. Ouyang, Y. Liu, S. Zhang, X. Zhang, J. Han, and W. Zhang, "Asymmetric excitation of surface plasmons by dark mode coupling," Science Advances, vol. 2, No. 2, p. e1501142, Feb. 2016.

Y. Zhang, T. Li, B. Zeng, H. Zhang, H. Lv, X. Huang, W. Zhang, and A. K. Azad, "A graphene based tunable terahertz sensor with double Fano resonances," Nanoscale, vol. 7, No. 29, pp. 12682-12688, 2015.

Y. Zhang, X. Zhang, S. Li, J. Gu, Y. Li, Z. Tian, C. Ouyang, M. He, J. Han, and W. Zhang, "A Broadband THz-TDS System Based on DSTMS Emitter and LTG InGaAs/InAlAs Photoconductive Antenna Detector," Sci. Rept., vol. 6, p. 26949, May 2016.

* cited by examiner

METHODS AND TUNABLE APPARATUSES FOR DYNAMIC DISPERSION COMPENSATION OF WIRELESS TERAHERTZ SIGNALS

CROSS-REFERENCE TO RELATED APPLICATIONS

This application claims priority from U.S. Provisional Patent Application Ser. No. 62/898,358 filed on Sep. 10, 2019 and from U.S. Provisional Patent Application Ser. No. 63/052,169 filed on Jul. 15, 2020, the entire contents of which are each incorporated in their entireties herein by reference.

FIELD

The present disclosure relates generally to devices, systems, methods, and techniques for dynamically compensating for atmospheric group delay dispersion in wireless terahertz signals.

BACKGROUND

Global consumption of wireless data has increased rapidly over the last ten years, and this trend is predicted to continue for the foreseeable future. The demand for wireless connectivity has spurred the development of fifth-generation (5G) wireless networks, yet there are already indications that 5G technology will be unable to support the massive amounts of data generated by the Internet of Things (IoT) and machine-to-machine (m2m) communications. In order to be physically capable of carrying next-generation data rates, future wireless communication technologies will require carrier frequencies of hundreds of gigahertz (GHz), pushing signals into what are commonly known as the terahertz bands.

Terahertz (THz) links show promise as a technology to enable high-bandwidth wireless communications, possibly to augment or even succeed fifth-generation (5G) systems. The high operating frequencies (0.1 to 10 THz) and wide bandwidths (in excess of 100 GHz) available for THz communication makes the technology capable of transmitting data at many tens of gigabits per second (Gbps).

Having a wireless alternative to trenched fiber would be advantageous. Firstly, wireless THz systems can be set up and made operational much faster than an optical cable can be trenched. This makes THz links attractive for situations that require rapid set-up with minimal existing infrastructure, such as disaster recovery, or in providing emergency connectivity after the loss of a fiber link. Secondly, THz links may provide high-bandwidth connectivity in situations where laying fiber optic cable may not be economically viable, such as serving high bandwidth internet to rural communities, over rugged or waterlogged terrain, or in applications where a physical cable is impossible to realize or prone to breakage (for example, in a link from earth to a geostationary satellite). This will enable important services such as online education, event streaming, and distance medicine to be provided to small towns or communities— the importance of which has been highlighted by the recent COVID-19 pandemic.

The development of any technology improving the bit rate-distance product or signal-to-noise ratio (SNR) of THz wireless links is needed. For THz wireless communications, there are two factors that limit achievable data rate and SNR. The most familiar is absorption, which limits SNR and is caused predominantly by rotational resonances of water vapor in the atmosphere. These resonances also directly impact data rate by introducing group delay dispersion (GDD). GDD arises when the many frequency components in a broadband signal propagate at different velocities due to the frequency-dependent refractive index of the channel medium. In the THz regime (0.1-10 THz), the atmosphere itself is one such dispersive channel. Because of GDD, single data bits, notionally represented by transform-limited THz pulses, spread temporally out of their assigned bit slot, superposing with bits in neighboring slots, resulting in inter-symbol interference (ISI). See e.g., FIG. 1. One solution to mitigate ISI is dilation of the bit slot, but this decreases the overall data rate and is undesirable.

Ultra-high definition (UHD) and 3-D video are example applications where dispersion control of point-to-point distribution of these signals will be needed. For UHD video, uncompressed (real-time) data rates of up to 25 Gbps are required. For 3-D video, the data rate can reach 100 Gbps. In a configuration analogous to fiber-optic systems with doped-fiber amplifiers, a series of point-to-point, wireless THz links might carry this high-bandwidth signal over tens of kilometers using repeater stations (which are generally more economical than full receivers). For such systems, dispersion would accumulate over the full distance of the link, easily causing a reduction in data rate by an order of magnitude or more. Therefore, dispersion management is needed.

GDD is an emerging problem in THz wireless systems. Unlike in microwave channels, water vapor resonances in the THz regime are very strong, and the available bandwidths are massive (60-180 GHz). Accordingly, it has been shown that GDD has a significant impact on THz wireless data rates.

While other fields like optics have developed solutions for GDD, such solutions are unsuitable to compensate the atmospheric dispersion of a wireless THz signal. For example, different design techniques and materials are used to compensate for GDD in optics systems. The compensating mechanism in a THz system needs to be tuned to substantially match the GDD of the atmosphere (whereas optical dispersion compensation devices are designed to exhibit a linear chirp in order to compress ultrashort laser pulses at optical frequencies), tunable to compensate for changing atmospheric conditions and/or path length (whereas in optical fiber, the conditions and range is relatively static and controlled), and operable at THz frequencies rather than optical frequencies. Accordingly, a need for dynamic dispersion compensation of wireless THz signals exists.

SUMMARY

When a dynamic dispersion compensating structure is illuminated by an incident terahertz signal, multiple reflections off the material boundaries and resonances between the layers cause the signal to experience frequency-dependent interference with itself. As some frequencies will penetrate deeper into the structure, and resonate between layers for a longer period of time, this interference is manifested as frequency-dependent group delay, which results in group delay dispersion. The thicknesses of the layers and/or geometries of the frequency-selective surfaces are tuned such that the group delay of the structure as a whole produces GDD of approximately the same frequency-dependent magnitude as that introduced by propagation through the atmosphere, except of the opposite (negative) sign, thus substantially eliminating or otherwise compensating GDD as a whole.

Multiple such structures may be used in concert to achieve better compensation of the THz signal. The parameters of the device as a whole (such as layer thicknesses, frequency-selective surface geometries, polarization, layer spacing, number of bounces off of a single structure, and/or the inclusion or prevention of bounces from a multiplicity of structures with either equal or differently tuned responses) may be dynamically adjusted to match changing atmospheric conditions and signal ranges.

An apparatus comprising a stratified structure having a front end and a back end, the structure comprising a plurality of adjacent dielectric layers of differing refractive indices. Each layer has a refractive index different from an immediately adjacent dielectric layer. The structure further includes a backing layer at the back end. The structure defining a group delay dispersion, and the structure is configured to introduce the group delay dispersion to a received terahertz signal and thereby produce a compensated terahertz signal when the received terahertz signal is reflected by the structure.

A method of compensating atmospheric dispersion of a terahertz wireless signal, comprising the steps of: receiving, by a dynamic dispersion compensator, the terahertz wireless signal, the terahertz wireless signal having group delay dispersion caused by the atmosphere. The method further including the step of reflecting, by the dynamic dispersion compensator, a compensated terahertz wireless signal. Wherein the data carried by the compensated terahertz signal corresponds to data carried by an initial terahertz wireless signal prior to introduction of the group delay dispersion caused by the atmosphere and atmospheric absorption losses. The dynamic dispersion compensator includes: a cohort of a plurality of stratified structures arranged relative to each other to communicate the terahertz signal. The cohort defines a group delay dispersion of the cohort, and includes at least one moveable reflective layer. Each stratified structure of the cohort has a front end and a back end, each stratified structure includes a plurality of adjacent dielectric layers of differing refractive indices, and each layer has a refractive index different from an immediately adjacent dielectric layer. Each stratified structure includes a backing layer at its back end, wherein each structure in the cohort defines a group delay dispersion. Wherein the at least one moveable reflective layer of the cohort is configured to move from a first position to a second position where the second position blocks the front end of at least one stratified structure in the cohort and thereby change the group delay dispersion of the cohort.

A dynamic dispersion compensator comprising: a cohort of a plurality of stratified structures arranged relative to each other to communicate a received terahertz signal. Wherein the cohort defines a group delay dispersion of the cohort and the cohort is configured to introduce a group delay dispersion to the received terahertz signal and reflect a compensated terahertz signal. The cohort includes at least one moveable reflective layer. Wherein each stratified structure of the cohort includes a front end and a back end, and each stratified structure includes a plurality of adjacent dielectric layers of differing refractive indices, and each layer has a refractive index different from an immediately adjacent dielectric layer, and each stratified structure includes a backing layer at its back end. Each structure in the cohort defines a group delay dispersion. The at least one moveable reflective layer of the cohort is configured to move from a first position to a second position where the second position blocks the front end of at least one stratified structure in the cohort and thereby change the group delay dispersion of the cohort.

An apparatus comprising a stratified structure having a front end and a back end. The structure comprising a plurality of adjacent layers of differing refractive indices, wherein each layer has a refractive index different from an immediately adjacent layer. The structure further including a backing layer at the back end. The structure defining a group delay dispersion, and the structure is configured to introduce the group delay dispersion to a received terahertz signal and thereby produce a compensated terahertz signal when the received terahertz signal is reflected by the structure.

BRIEF DESCRIPTION OF THE DRAWINGS

The following drawings are for illustrative purposes only and are not intended to be limiting.

DETAILED DESCRIPTION

The terms of approximation, including, "generally," "substantially," "about," "approximately," and the like, and each of their respective variants and derivatives will be understood to allow for minor variations and/or deviations that do not result in a significant impact thereto. Such terms of approximation should be interpreted according to their ordinary and customary meanings as used in the associated art unless indicated otherwise. Absent a specific definition and absent ordinary and customary usage in the associated art, such terms should be interpreted to be ±10% of the base value.

The use of ordinal number terminology (i.e., "first," "second," "third," "fourth," etc.) is for the purpose of differentiating between two or more items and is not meant to imply any sequence or order or importance to one item over another or any order of addition. The term "or combinations thereof" as used herein refers to all permutations and combinations of the listed items preceding the term. The skilled artisan will understand that typically there is no limit on the number of items or terms in any combination, unless otherwise apparent from the context.

As will be used herein, directional terms, such as "above," "below," "upper," "lower," "top," etc. are used for convenience in referring to the accompanying drawings and descriptions thereof and are not intended to limit the scope of the appended claims.

Figure 1:
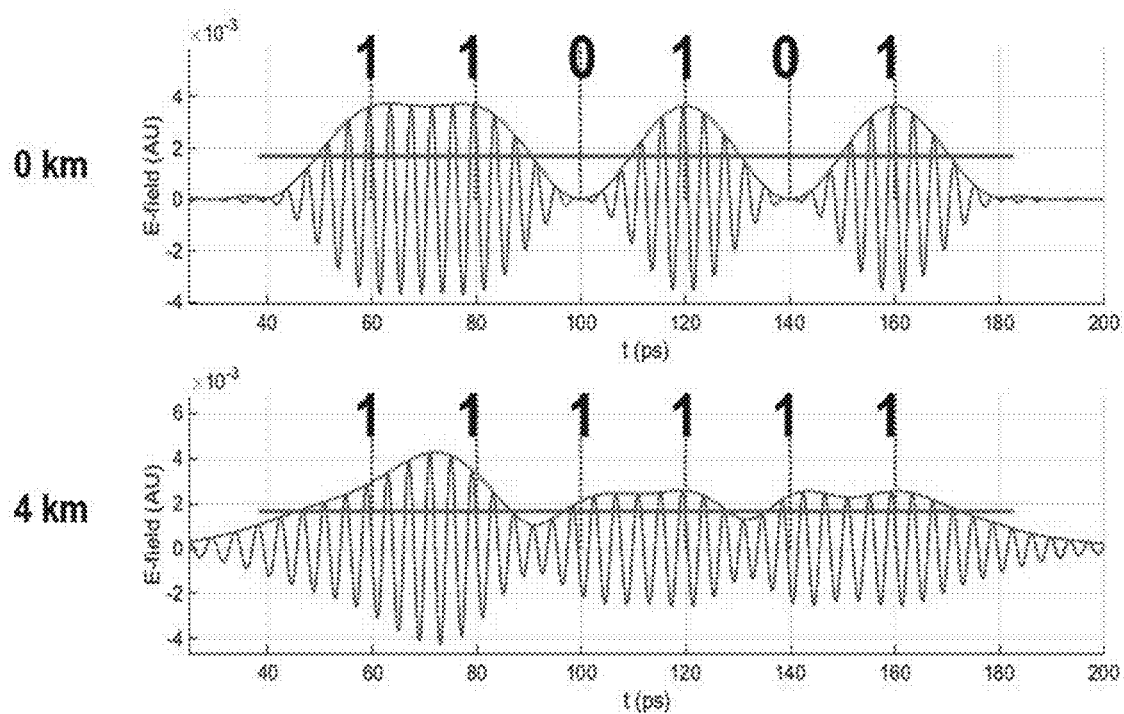
FIG. 1 is an illustration of data corruption of a THz signal after propagating through a 4 km channel at 20° C. and a water vapor density of 10.37 g/m$^3$.

As noted, the various frequencies contained in a broadband, wireless electromagnetic signal in the terahertz spectrum travel at different speeds through the atmosphere, causing group delay dispersion (GDD) that varies with range and atmospheric conditions. The effects of GDD are illustrated in FIG. 1. For example, FIG. 1 is an illustration of data corruption of a THz signal after propagating through a 4 kilometer (km) channel at 20 degrees Celsius (° C.) and a water vapor density ($\rho_{wv}$) of 10.37 grams/meter³ (g/m³). As illustrated in FIG. 1, an ideal-impulse-encoded bit sequence is provided on top and the same bit sequence corrupted by GDD is on bottom. The signal spectrum is centered at 250 GHz and has a full width at half maximum bandwidth of 50 GHz. The dispersed waveform (bottom) has been scaled up by 7 times to aid in comparison.

Figure 2:
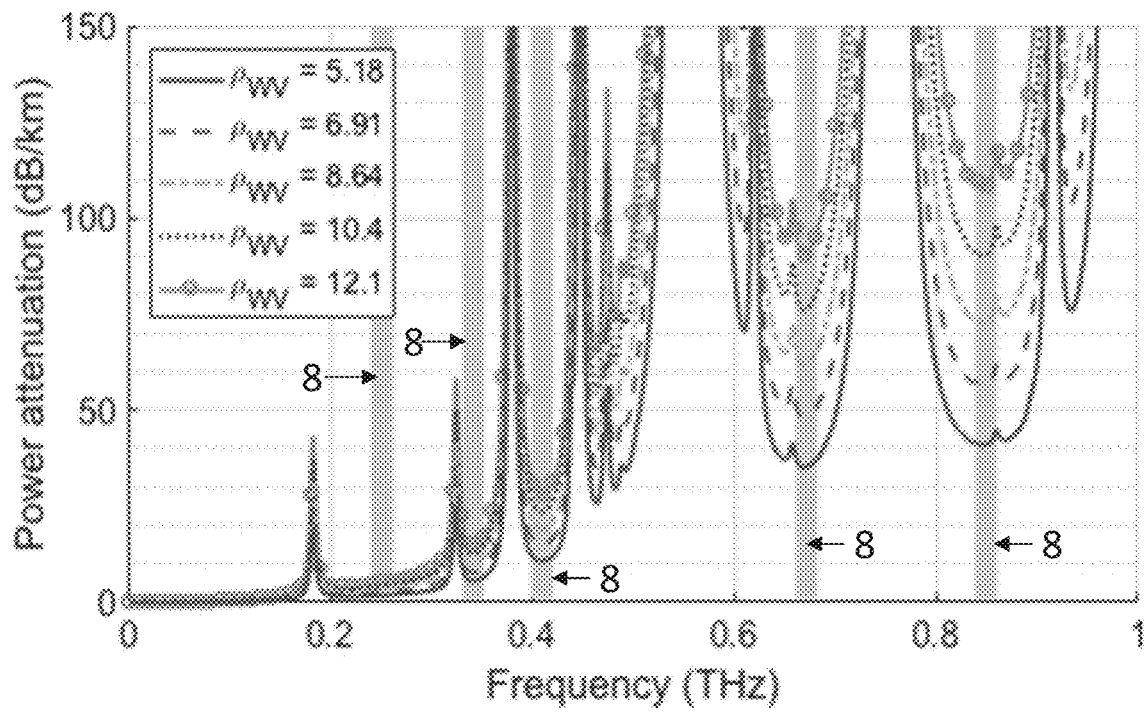
FIG. 2 illustrates the power attenuation of THz waves in the atmosphere as a function of frequency and water vapor density (in g/m$^3$) at sea level and a temperature of T=20° C.

As illustrated in FIG. 2, water vapor and molecular oxygen can strongly absorb THz waves in the 0.1-1 THz band, and dramatically do so around resonant absorption lines. In THz wireless systems it is usually desirable to operate in atmospheric transmission windows centered at frequencies shown by reference numeral 8 in FIG. 2 to help minimize loss.

Figure 3:
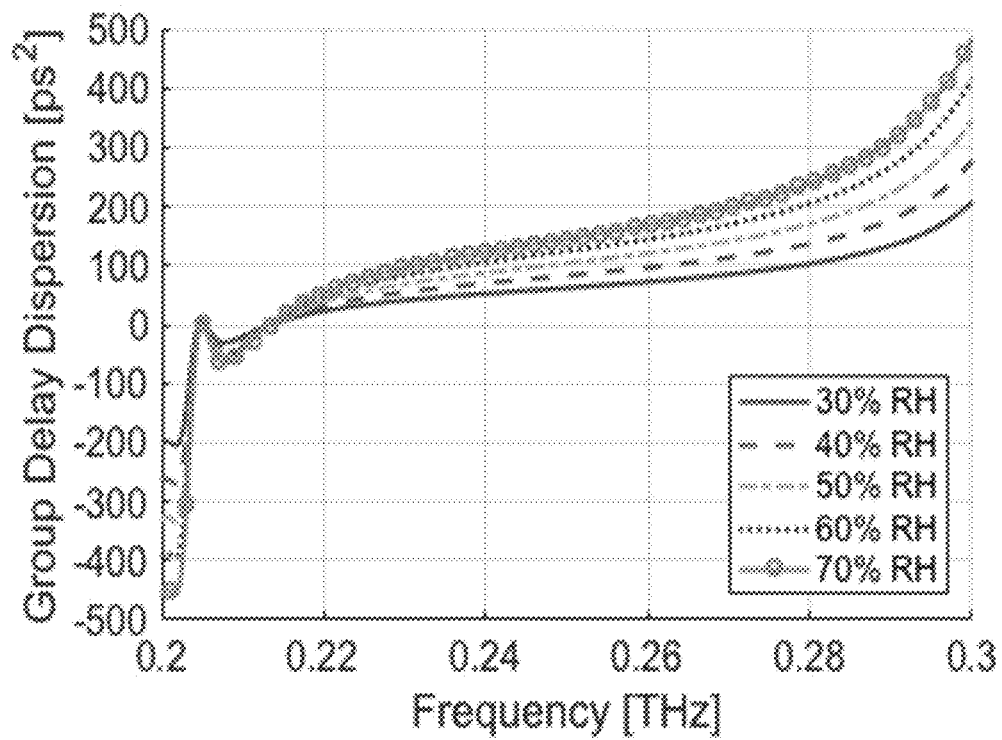
FIG. 3 illustrates various GDD for various relative humidity in the 0.2-0.3 THz atmospheric window.

A person skilled in the art is aware of the relationship between "group velocity dispersion" (GVD), "group delay" (GD), and "group delay dispersion" (GDD). However, a brief explanation will be provided now as these terms are used throughout this description and in the examples. FIG. 3 illustrates various GDD for various relative humidities (RH) in the 0.2-0.3 THz atmospheric window after 4 km of atmosphere at 30-70% RH at sea level and temperature, T=20° C. Once a channel is selected, based on required bandwidth and range, atmospheric models are used to produce a transfer function of the atmosphere. The transfer function captures the frequency-dependent phase shift, which is used to derive group delay $\phi_1$ and group delay dispersion $\phi_2$ according to:

$$\phi_1 = \frac{\partial}{\partial \omega} \phi(\omega_0)$$

$$\phi_2 = \frac{\partial^2}{\partial \omega^2} \phi(\omega_0)$$

where $\phi(\omega)$ is the measured phase shift of the wave transmitted through the atmosphere and $\omega_0$ indicates an evaluation of the derivative(s) at the band center frequency. Note that group velocity dispersion may be derived from GDD by normalization to the propagation distance d, or GVD=$\phi_2$/d. FIG. 3 is illustrative of the dispersion effect on an initial THz signal as will be discussed later in connection with FIG. 10A.

The present disclosure describes devices capable of compensating and/or substantially eliminating the effects caused by the atmospheric GDD. As will be further described, such devices are dynamically tunable to compensate for changing GDD over a wide range of conditions.

Figure 4:
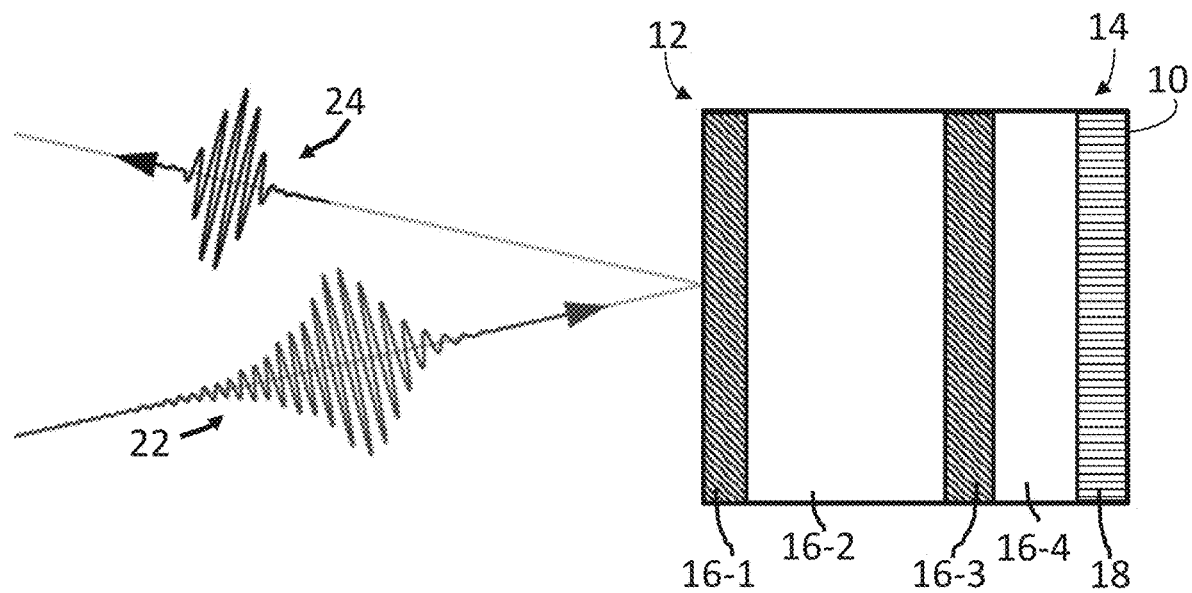
FIG. 4 is an example dynamic dispersion compensation structure.

A stratified structure 10 having a front end 12 and a back end 14 is illustrated in FIG. 4. Structure 10 comprises a plurality of adjacent layers 16 (sometimes designated as 16-1-16-N) of differing refractive indices. Each layer 16 has a refractive index different from an immediately adjacent layer 16. Structure 10 further includes a backing layer 18 at back end 14. Structure 10 defines a group delay dispersion. Structure 10 is configured to introduce GDD to a received terahertz signal. The received terahertz signal is also referred to as dispersed terahertz signal 22 as it is a terahertz signal experiencing dispersion caused by the atmosphere.

Figure 19A:
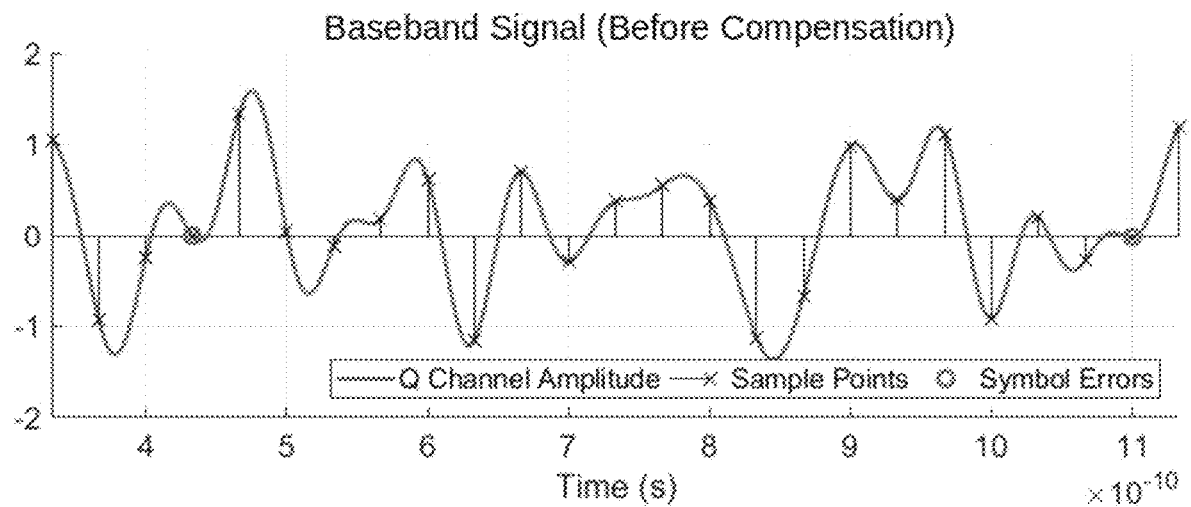
FIG. 19A shows a THz data signal corrupted by atmospheric GDD prior to compensation.
Figure 19B:
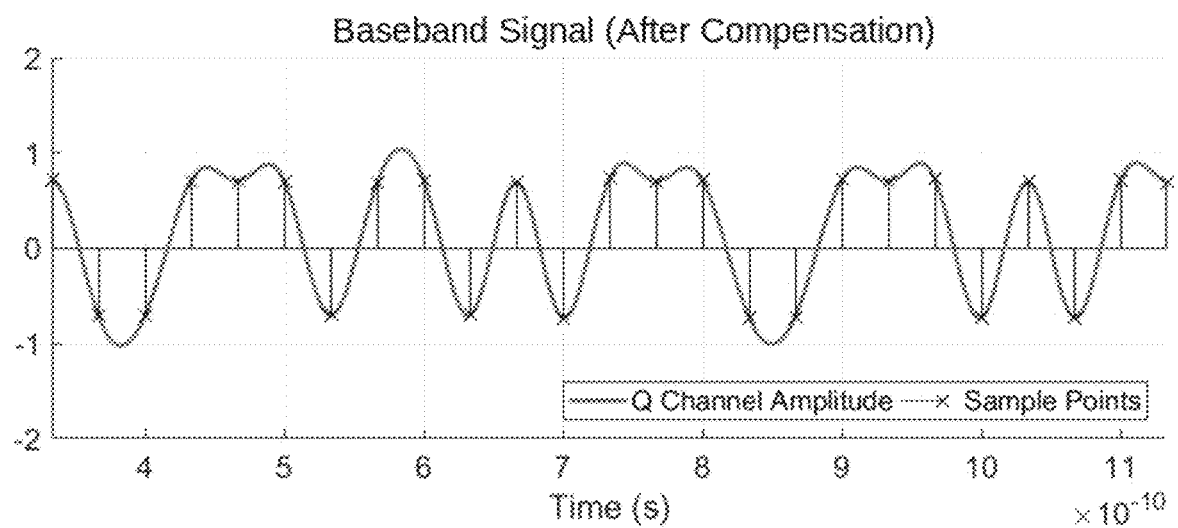
FIG. 19B shows the same THz data signal of FIG. 19A without errors, after atmospheric dispersion has been compensated.

Structure 10 is configured to produce a compensated terahertz signal 24 that substantially removes or substantially minimizes the effects of the dispersion caused by the atmosphere. For example, the GDD introduced to the received terahertz signal is substantially opposite to the GDD introduced by the atmosphere. The GDD introduced by the atmosphere can take any shape and is not necessarily monotonic nor linear. Data represented by the compensated terahertz signal corresponds to data represented by an initial terahertz signal prior to the introduction of GDD by the atmosphere. Stated another way, the data represented by the reflected terahertz signal is no longer irresolvable due to atmospheric GDD and more closely corresponds to data represented by the initial terahertz signal as it would have been received had it not experienced any GDD by the atmosphere. For example, FIG. 19A is illustrative of a THz data signal corrupted by atmospheric GDD prior to compensation by the devices and techniques of the present disclosure. As shown in FIG. 19A, there are a number of errors as a result of atmospheric GDD. FIG. 19B shows the same THz data signal of FIG. 19A without errors after compensating atmospheric dispersion by the devices and techniques of the present disclosure.

Layers 16 of structure 10 are transparent dielectric materials. Suitable dielectric materials include low-loss materials, including, without limitation, silicon, sapphire, quartz, polytetrafluoroethylene (PTFE), polyimide, polymethylpentene (TPX), polystyrene (PSX), cyclo-olefin polymer, cyclo-olefin copolymer, polydimethylsiloxane (PDMS), parylene, low-loss plastic, polyethylene, high-density polyethylene, polymethyl methacrylate (PMMA), low-loss resin, epoxy-based negative photoresist like SU-8, epoxy and epoxy-based resins, blends, dry films such as those provided by DJ Microlaminates, Inc. of 490 Boston Post Road, Sudbury, Mass. 01776 under the trademark SUEX, photopolymer resin, low-loss glasses, borosilicate, fused silica, low-loss ceramic, titanium dioxide, fluids (e.g., liquids and gases) such as oil, air, nitrogen, helium, neon, argon or combinations of one or more of any of the foregoing. Other suitable materials having comparable qualities or that are capable of producing the described effects and results can also be used. One or more layers 16 or structure 10 may be hermetically sealed, such enclosure will depend on a given application and will be apparent in light of this disclosure. For example, and not by way of limitation, when one or more layers 16 is a fluid, the thickness of each layer of the fluid may be about 1 micrometer-about 2,000 micrometers for a given application. The quantity of layers 16, thicknesses, and/or dimensions of a given layer 16 can be customized as desired for a given target application or end-use.

In some aspects, backing layer 18 is a reflector. Example reflectors include reflective metals, such as, but not limited to aluminum, gold, silver, copper, titanium, nickel, cobalt, chromium, molybdenum, platinum, tungsten, and alloys of any of the foregoing. Other suitable metals or alloys include those having sufficient and/or high conductivity that are capable of achieving the described effects and results of compensating atmospheric GDD of a terahertz signal. In some applications, selection of a reflective metal or alloy includes those that are not or are minimally susceptible to oxidation. It should be appreciated that materials that are susceptible to oxidation may also be used and those skilled in the art can make modifications to prevent the oxidation of such backing layer.

In some arrangements, backing layer 18 is a reflective frequency-selective surface. Additionally, in some arrangements, one or more layers 16 of the stratified structure 10 is a frequency-selective surface.

The GDD of stratified structure 10 may be dynamically tunable. For example, by changing for varying spacings, incidence angle, layer thicknesses, polarization responses, and/or the quantity of layers 16 changes the GDD of stratified structure 10. Such dynamic tunability allows stratified structure to compensate for changing atmospheric GDD over a wide range of conditions.

For example, changing the thickness of one or more layers 16 of structure 10 thereby changes the GDD of the structure. For example, when one or more of layer 16 is a fluid, e.g. a gas or liquid, the thickness of these fluid layers can be changed by moving the adjacent layers via actuators, including without limitation, piezo-electric actuators, or some other suitable mechanism such that the fluid layer is the desired thickness and then introducing or removing fluid in the adjustable layer 16.

Figure 6:
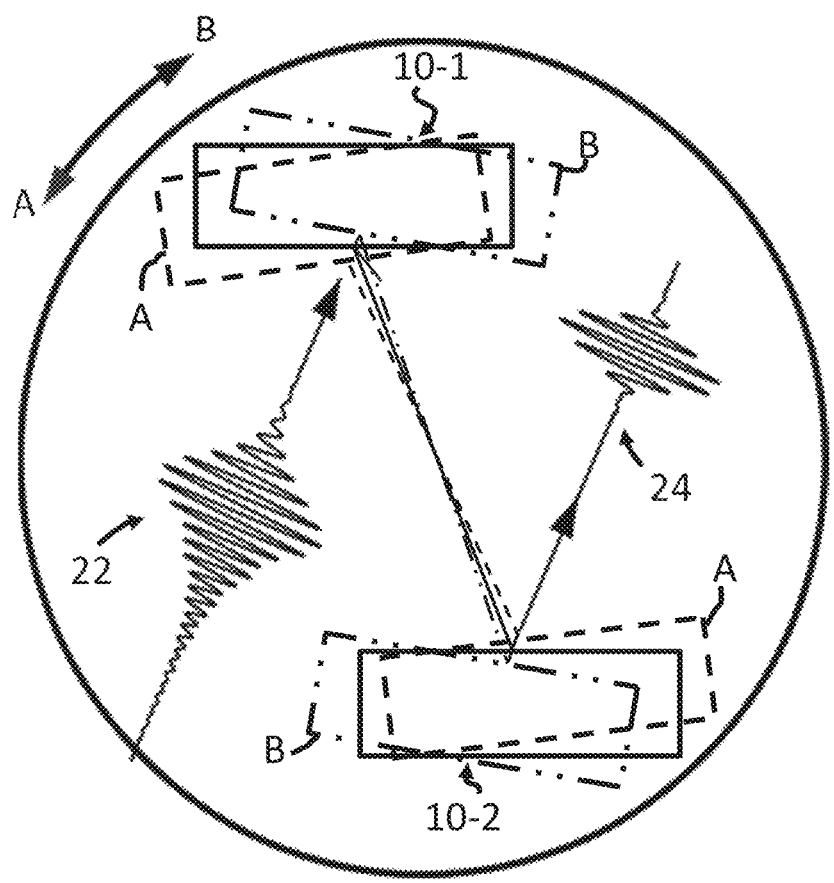
FIG. 6 illustrates a way to vary obliquity to change GDD by rotating the dynamic dispersion compensation structures in the A-B directions.

Another example of changing the GDD is to rotate structure 10. For example, when more than one structure 10 are used to form cohort 28 (described further in this disclosure), such structures 10 can be rotated in such a way to cause the reflected terahertz signal to take a different path, and causes multiple reflections from cohort 28. For example, FIG. 6 is illustrative of oblique-incident tuning of when structure 10 is rotated in the A-B directions as indicated.

Structure 10 may be mounted or operably connected to one or more mechanisms, such as actuators, gimbals, or any other device capable of achieving the desired movement is suitable. Depending upon the application and use, structure 10 may be oriented such that an angle of incidence for each structure is between about 0 degrees to about 90 degrees, inclusive.

Figure 5A:
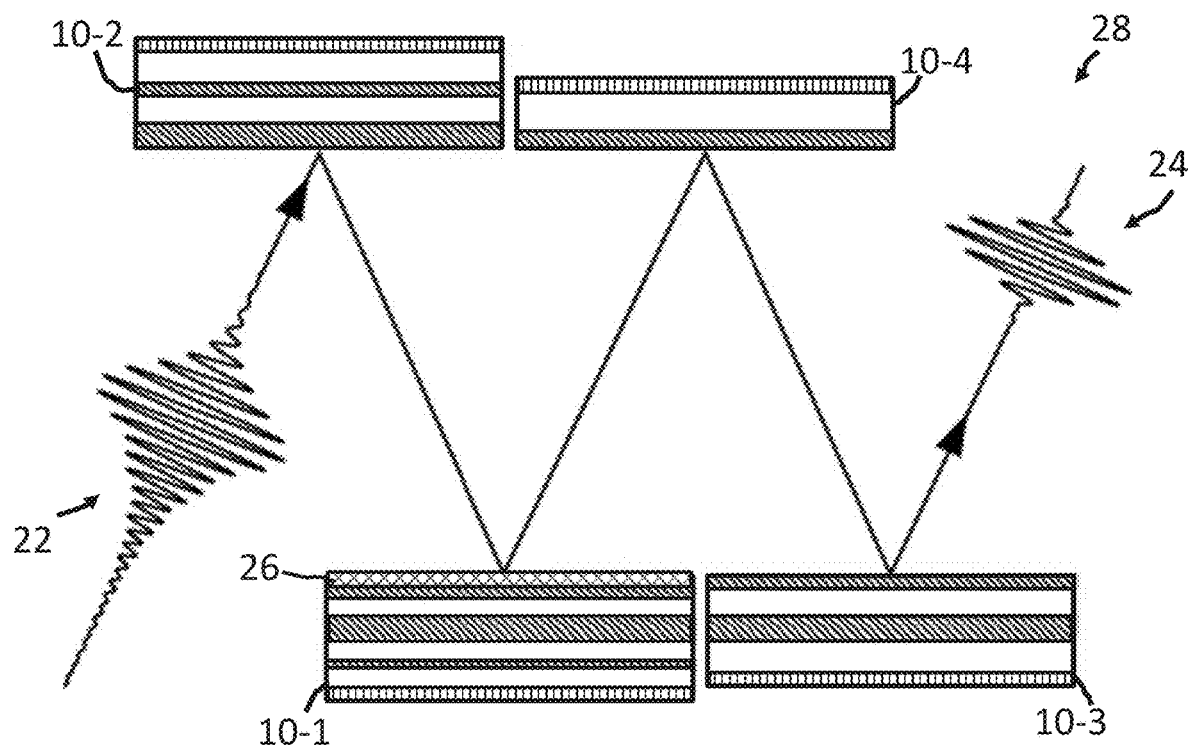
FIGS. 5A and 5B illustrate example cohorts comprised of a plurality of dynamic dispersion compensation structures.
Figure 5B:
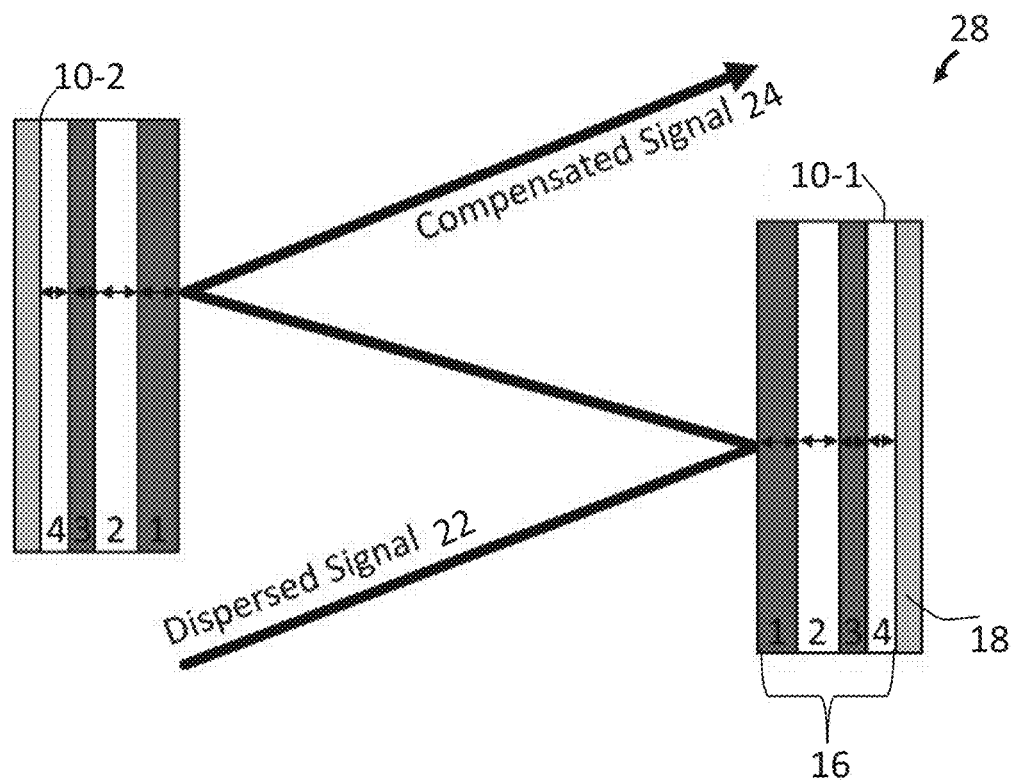
Figure 7:
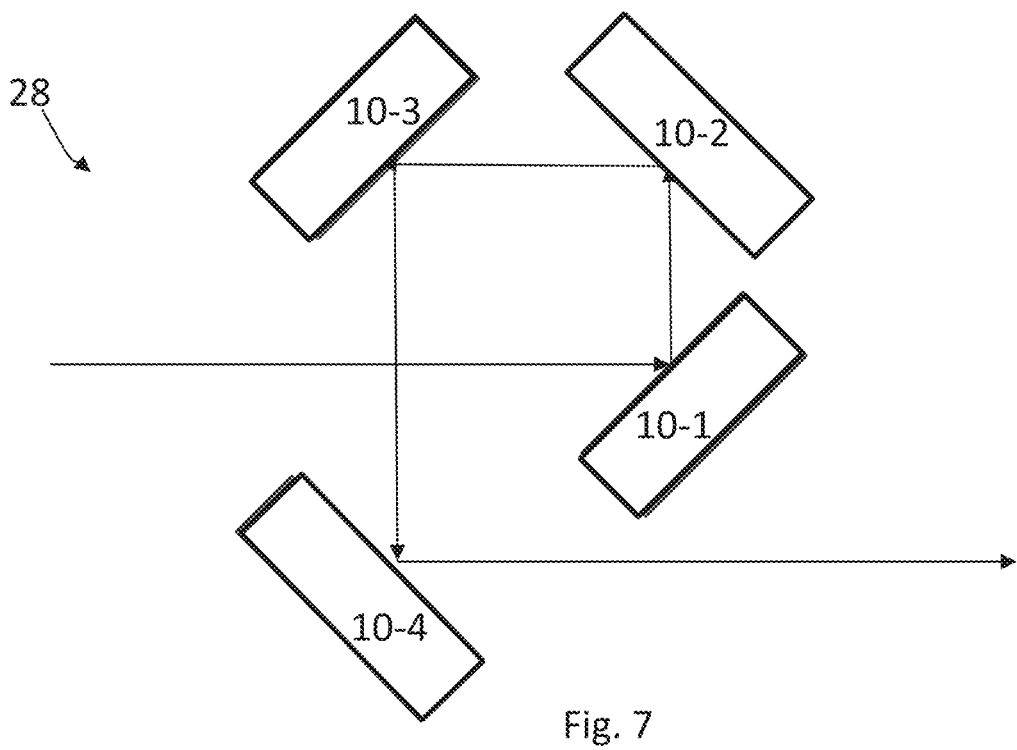
FIG. 7 is illustrative of an example configuration of the dynamic dispersion compensation structures in a cohort.

In some aspects, a plurality of structures 10 are used to form cohort 28. FIGS. 5A, 5B, and 7 are illustrative of various cohorts 28. The plurality of structures 10 are arranged relative to each other to communicate a terahertz signal. Each structure 10 is configured such that it has its own GDD and the plurality of structures 10 that form cohort 28 define a GDD for the cohort. One or more structures 10 forming cohort 28 may have the same GDD of one or more other structures 10 in cohort 28 or each structure 10 in cohort 28 may have different GDD from the other structures 10. Cohort 28 includes at least one moveable reflective layer 26 that is configured to move from a first position to a second position. As illustrated in FIG. 5A, when moveable reflective layer 26 is positioned in the second position, it blocks front end 12 of the structure 10 it is positioned in front of. As a result, the GDD of cohort 28 is thereby changed. Moveable reflective layer 26 can be any reflective material, such as a reflective metal or suitable mirror to redirect an incident signal to other structures 10 in cohort 28.

FIG. 5A is an illustrative example of cohort 28 composed of a plurality of structures 10. For example, structures 10 of cohort 28 are arranged with progressive levels of GDD so that a combination of reflections can be selected for the current conditions. For example, structures 10 can be set up with octave-based compensation as shown in Table 1. FIG. 5A is illustrative of an octave-based compensation cohort 28 configured to compensate a dispersed THz signal for any range from about 0 km to about 7.5 km in 0.5 km steps as illustrated in Table 1.

TABLE 1

| Structure | Compensating range (RH = 50%) |
|---|---|
| 10-1 | 4 km |
| 10-2 | 2 km |
| 10-3 | 1 km |
| 10-4 | 0.5 km |

The octave-based cohort illustrated in FIG. 5A and Table 1 is representative one of many ways structures 10 in cohort 28 may be arranged. For example, an angle of incidence for each structure of the cohort is between about 0 degrees and about 90 degrees. Depending upon how structures 10 in cohort 28 are arranged, an angle of incidence for each structure of the cohort is between about 0 degrees and about 45 degrees. Cohort 28 may have any geometry suitable for achieving the effects of compensating for atmospheric dispersion as described in this disclosure. For example, the structures within the cohort may be arranged to form ring, pentagon, or channel geometry as illustrated in FIGS. 5A, 5B, and 7. Furthermore, the geometries and angle of incidence for structures 10 in cohort 28 will depend on a given application and will be apparent in light of this disclosure.

Dynamic tuning of cohort 28 can be achieved as described above by positioning one or more moveable reflective layers 26 in front of one or more structures 10 in the cohort. The mechanisms for positioning moveable reflective layer include, without limitation, gimbals, actuators, and the like. Any other mechanism or technique for positioning reflective layer 26 to redirect an incident signal and adjust the GDD of the cohort as described is also suitable.

As previously described, the GDD for each structure 10 can be adjusted in a number of ways, including rotating one or more structures 10 in cohort 28 as depicted in FIG. 6; adjusting a thickness of one or more layers 16 of one or more structures 10 of cohort 28; or positioning one or more moveable reflective layers 26 in front of one or more structures 10 of cohort 28 as shown in FIG. 5A, or any combination of any of the foregoing.

Figure 18A:
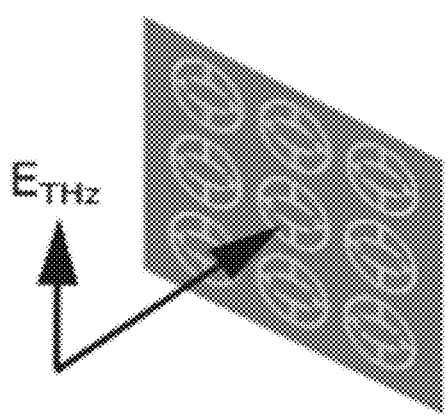
FIG. 18A illustrates an example frequency-selective surface having a plurality of resonators thereon.
Figure 18B:
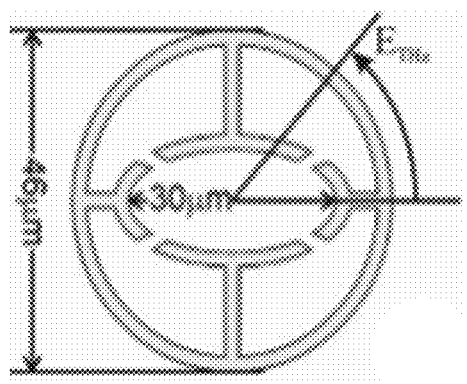
FIG. 18B is close-up of a THz resonator depicted in FIG. 18A.

Frequency-selective surfaces (metafilms). For example, layers 16 and/or backing layer 18 may be a frequency-selective surface (or metafilm). Electromagnetic waves excite metafilms, which store the energy and then re-emit it with a frequency-dependent phase shift. An example frequency-selective surface having a plurality of resonators or unit cells thereon with wave incident in vertical polarization is illustrated in FIG. 18A with an example close-up of a THz resonator design depicted in FIG. 18B. For example, to adjust the GDD of the frequency-selective surface, the surface can be rotated about the wave propagation axis and thereby compensate for a variety of atmospheric conditions or signal ranges. For example, if phase needs to be adjusted for a different THz wavelength, the effective size of the resonator can be changed. When in use and the size of the resonator cannot be changed, the layer can be rotated as previously described. Dynamic tunability may also be achieved by adding parasitic elements to the frequency-selective surface, such as semiconductor inclusions such that when stimulated optically or electronically these elements dampen the resonances or shift resonance frequency and thereby change the phase shifts imparted to the THz waves.

A dynamic dispersion compensating (DDC) device may take many forms depending upon the application and end-use. For example, the DDC device may be comprised of structures 10 formed of a plurality of dielectric layers and have as its backing layer 18 a reflective metal; in other forms, backing layer 18 is a frequency selective surface. In other aspects, the DDC device may be a structure of a plurality of frequency-selective surfaces (or two-dimensional metamaterial surfaces), with or without dielectric substrates, with surface properties turned to exhibit a composite frequency response identical (or nearly so) to the stack of bare dielectrics (as described elsewhere in this disclosure). For example, DDC devices comprising frequency-selective surfaces may also be configured to be dynamically tunable by means of electronic, mechanical, or other mechanisms affecting the response of the frequency-selective surface in amplitude, polarization, or frequency response; all of which are within the skillset of a person skilled in the art. In other aspects, the DDC device may be a hybrid structure where layers 16 are composed of both dielectrics and frequency-selective surfaces and backing layer 18 is a reflective metal or a reflective frequency-selective surface. The composition of whether structure 10 is formed of dielectrics, frequency-selective surfaces, etc. can be customized as desired for a given target application or end-use.

For example, the described DDC devices can be used in point-to-point links. As previously described the DDC device can be inserted prior to a THz beam being sent to a receiver. Adjustment of the DDC devices to account for changing conditions may take many forms. For example, and not by limitation, the receiver and transmitter may include a number of sensors, such as temperature and water vapor sensors. A computing device operably connected may be programmed to assume an average relative humidity between the transmitter and receiver, or receive such information and calculate the average relative humidity. Depending upon the inputs, the computing device can automatically adjust the DDC devices to adjust the GDD for the given conditions or signal link. Alternatively, or supplementary, the data within the receive signal can be reviewed for bit error as the data rate will be known. Accordingly, if the bit errors meet or exceed a predetermined threshold, the computing device operably connected to the DDC devices can adjust for the given conditions.

Examples. The following examples are provided in a number of sections. These examples are based on several documents and articles and the descriptions within the examples may overlap in many areas.

As will be seen in the examples, the examples describe an exemplary DDC structure 10 (also referred to in this document as structure 10) and cohorts 28 for a specific terahertz transmission window, specifically a 0.2-0.3 THz channel under common atmospheric conditions. Accordingly, for ease of discussion regarding these examples, use of the terminology, "group velocity dispersion" (GVD) is used as well as "group delay" (GD) and "group delay dispersion" (GDD). A person skilled in the art is aware of the relationship of GVD and GDD, and that GVD can be derived from GDD for a given bandwidth and range. As is evident in the following examples, GVD is used in connection with the specific conditions set forth in the examples.

Example 1. Compensating Atmospheric Channel Dispersion for Terahertz Wireless Communication In ultra-wideband or impulse radio terahertz wireless communication, the atmosphere reshapes terahertz pulses via group velocity dispersion, a result of the frequency-dependent refractivity of air. Without correction, this can significantly degrade the achievable data transmission rate. A dynamic dispersion compensating device is provided that is configured to compensate the atmospheric dispersion of terahertz pulses using a cohort 28 of DDC structures 10. As will be described below, the exemplary dynamic dispersion compensating device compensated group velocity dispersion in the 0.2-0.3 THz channel under common atmospheric conditions. Based on analytic and numerical simulations, the techniques described herein and the resulting device can exhibit an in-band power efficiency of greater than 98% and dispersion compensation up to 99% of ideal. Simulations were validated by experimental measurements as described further in this example.

1.1 Introduction.

As will be described further in this example, a device for compensating GVD in THz wireless communication channels that is highly effective, offers zero latency, consumes no power, and has low insertion loss is disclosed. In this example, the 0.2-0.3 THz frequency channel is used and a compensation of up to 99% of the GVD experienced by a transform-limited THz pulse propagating through 4 km of atmosphere with a water vapor density of $\rho=10.37$ g/m$^3$ (60% relative humidity (RH) at 20° C.) is disclosed. For example, the disclosed techniques and resulting apparatuses can be implemented in a monolithic device that can simply be inserted into the THz beam to correct the signal GVD, and that has an insertion loss as low as 0.07 decibels (dB) (over 98% power efficient).

1.2 Results.

To compensate atmospheric dispersion, a dynamic dispersion compensating device is introduced into the THz beam that has GVD substantially equal but opposite to that of the atmosphere. The resulting overall channel, comprised of both the atmosphere and the dynamic dispersion compensating device, thus exhibits a cumulative GVD approaching zero. Dynamic dispersion compensating device includes DDC structure 10. DDC structure 10 includes a plurality of layers 16-1-16-N. In this example, layers 16 are stratified dielectrics, arranged strategically in front of backing layer 18. In this example, backing layer 18 is a reflective material. The dielectric layers 16 alternate between low and high refractive index, and the resonant trapping of frequencies within structure 10 introduces a frequency-dependent group delay. The optical thickness of each layer 16 is tuned such that the overall GVD of structure 10 substantially matches the atmospheric opposite over a broad bandwidth. The THz wave experiences this opposite GVD during reflection from structure 10.

Figure 8:
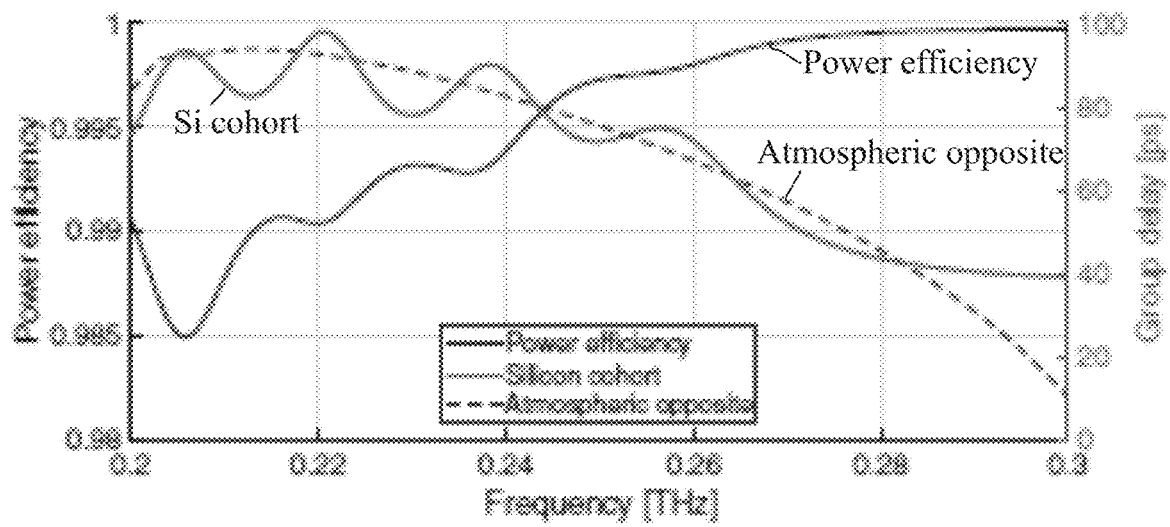
FIGS. 8 and 9 are a plot of the analytic performance of example silicon and PTFE dynamic dispersion compensation devices, respectively.

The general structure 10 is illustrated in FIG. 4. The parallel dielectric multilayers 16 can be modeled by means of characteristic matrices and the overall structures 10 may be designed and rapidly optimized using genetic algorithms. For purposes of design and simulation for this example, it is convenient to use group delay (GD) instead of GVD, since the former is specific to a set of channel conditions, whereas GVD is normalized to channel length. The curve labeled "Atmospheric Opposite" in FIG. 8 shows the ideal group delay profile for compensating a 4 km path length through an atmosphere with uniform water vapor density $\rho_{wv}$=10.37 g/m$^3$ (60% relative humidity at 20° C.) over the entire 100 GHz band centered at 0.25 THz.

While FIG. 4 shows a single DDC structure 10, two different DDC structures 10 were actually employed together as a cohort to compensate the above described dispersion. Using cohort 28 increased the effectiveness of compensation by improving the fit to the atmospheric opposite over a larger bandwidth. Each DDC structure 10 was designed with alternating layers of high-resistivity silicon (Si) and air. The layer thicknesses were obtained by using a genetic algorithm to compute the optimal characteristic matrix for a cohort 28 of two DDC structures 10 in reflection. In this example, the optimal layering for the first DDC structure 10-1 was 190 μm of silicon, 760 μm of air, 210 μm of silicon, 250 μm of air, and finally the backing layer 18, which was a reflector. Thickness variations of ±5 μm had minor effects to overall performance. The silicon was assumed to be lossless with a refractive index of $n_{Si}$=3.418. For the second DDC structure 10-2, the layering was 210 μm of silicon, 800 μm of air, 260 μm of silicon, 90 μm of air, and a reflector as a backing layer. In operation, the THz wave would reflect once from each DDC structure 10 to achieve full compensation. The cohort 28 reflects more than 98% of incident power (0.03 dB insertion loss per DDC structure per reflection) where conductor losses in backing layer 18 constituted the majority loss mechanism. The cohort design also resulted in a good fit to the target group delay curve, as can be seen from FIG. 8.

Another cohort 28 of DDC structures 10 based on polytetrafluoroethylene (PTFE) layers was also made. The first DDC structure 10-1 had a layering of 480 μm of PTFE, 380 μm of air, 510 μm of PTFE, 250 μm of air, and finally a reflector as backing layer 18. The second DDC structure 10-2 of cohort 28 had a layering of 430 μm of PTFE, 750 μm of air, 540 μm of PTFE, 290 μm of air, then a reflector as backing layer 18. Similar to the Silicon-based cohort previously described in this example, the PTFE-based cohort is configured to compensate the dispersion produced by 4 km of propagation through the atmosphere with $\rho_{wv}$=10.37 g/m$^3$ (60% relative humidity at 20° C.). Note that PTFE has a lower refractive index than silicon (a constant index of $n_{PTFE}$=1.42+i0.0032 was assumed based on measurements), which reduces the reflections at the layer boundaries, resulting in less overall dispersion. This allowed for a more precise match of the atmosphere's dispersion profile for varying water vapor densities at the expense of cumulative dispersive power.

Figure 9:
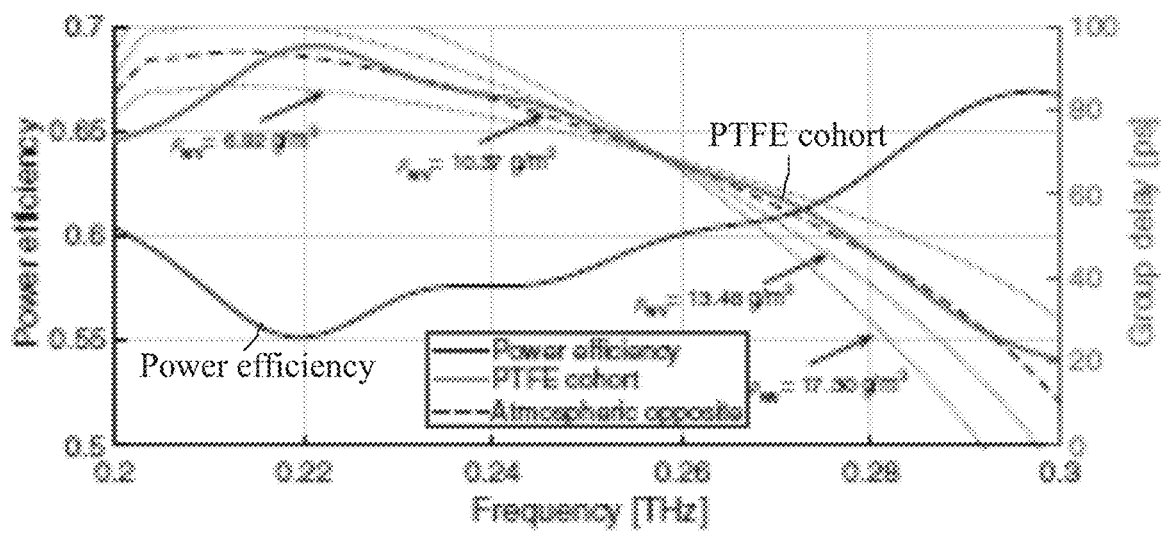

PTFE absorptive losses are not large in the THz range, but they accumulate when waves traverse the layers of the DDC structure multiple times, leading to greater overall insertion loss than a silicon-based DDC structure. Because of this, both layer 16 and backing layer 18 losses need to be accounted for. Despite this added loss, the PTFE-cohort is still highly effective at compensating atmospheric dispersion over shorter distances. This example cohort of two DDC structures reflects more than 86% of incident power for a single pass through the cohort (0.3 dB insertion loss per DDC per reflection). However, since its dispersive power is about 25% of the Si-based cohort, the THz beam must reflect from each PTFE-DDC structure four times to compensate the target 4 km channel, which lowers the overall cohort power efficiency to 55% (minimum) or 2.6 dB insertion loss total, as shown in FIG. 9. An advantage of the PTFE-cohort, apparent from FIG. 9, is that it exhibits a better fit to the target group delay curve.

To further demonstrate the cohorts, the time-domain waveforms for THz pulses before and after compensation were calculated. Again, it was assumed plane-wave propagation of a THz pulse through the atmosphere at $\rho_{wv}$=10.37 g/m$^3$ over a distance of 4 km. The initial transform-limited pulse was given a raised cosine spectrum centered at 0.25 THz, with a full-width-half-max (FWHM) bandwidth of 0.05 THz. After propagating through the atmosphere, this pulse was dispersed to 175% of its original width by GDD and reduced in amplitude by 9.1 times due to water vapor absorption losses, as shown by the electric-field waveforms in FIG. 10A. For determination of the pulse width, an approximately Gaussian profile of the pulse both before and after dispersion was assumed.

This dispersed pulse was compensated by both the Si- and PTFE-based cohorts. As before, compensation was achieved by either one (Si), or four (PTFE), normal-incidence reflections off the cohort. These atmospheric conditions represent a natural transition point between the silicon and PTFE approaches. The silicon cohort cannot be used for less compensation because there can be no less than one reflection, while the PTFE cohort is less desirable for more compensation because of accumulating losses. The analytic transfer functions of the cohorts were calculated and multiplied by the dispersed pulse spectrum in the frequency domain, then an inverse Fourier transform was used to obtain the time-domain output waveforms in the plots.

Figure 10A:
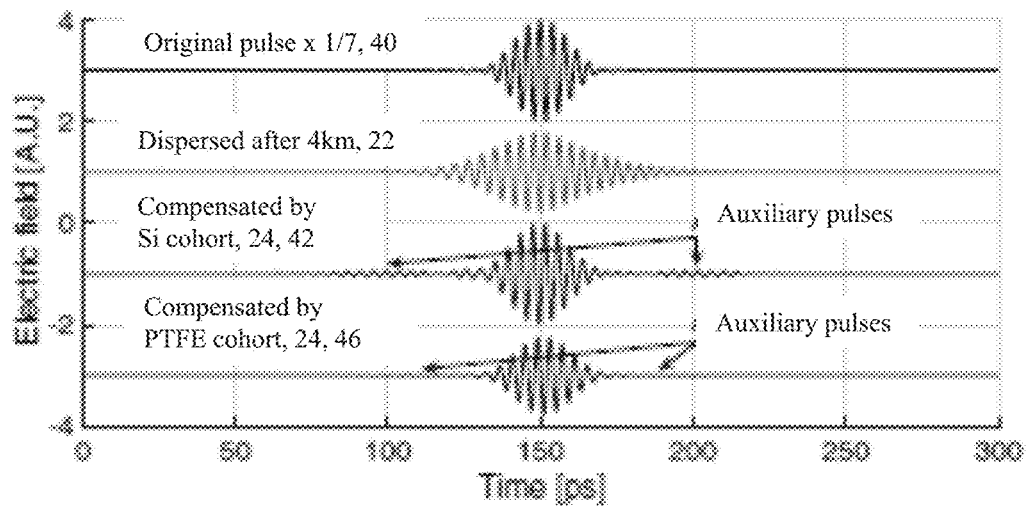
FIG. 10A is a plot of time-domain THz pulses before and after propagation through the atmosphere and the compensating devices.

As shown in FIG. 10A, the pulse went from 175% to 105% (for both Si and PTFE) of its original width. This significant reduction in pulse width corresponds to a 66% increase in spectral efficiency, $\eta_{eff}$=B/$\Delta f_{ch}$, where $\Delta f_{ch}$ is the pulse bandwidth, and B is the bit rate, which is inversely proportional to the pulse width. Even a perfect dispersion compensation scheme cannot fully compensate for atmospheric dispersion, because some signal bandwidth is irreversibly lost due to absorption. When this is accounted for, the Si-based and PTFE-based cohorts both achieve >99% of the theoretically possible dispersion compensation, and the PTFE-based cohort is better, nearly reaching perfect compensation (99.8% by calculation).

Figure 10B:
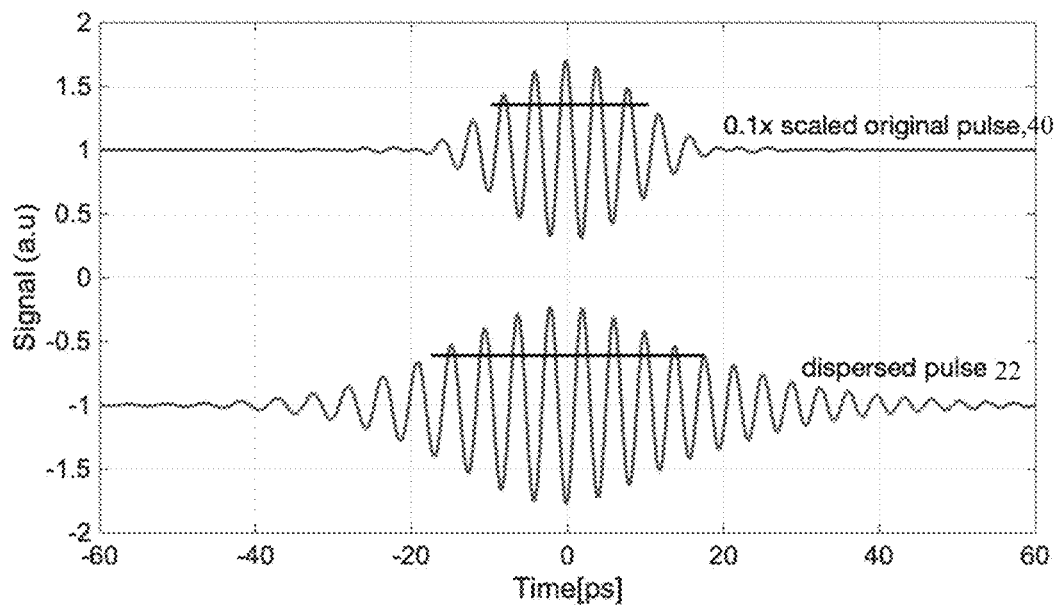
FIG. 10B is a plot of THz pulses before and after propagation through the atmosphere illustrating the dispersion effect on the pulse.
Figure 10C:
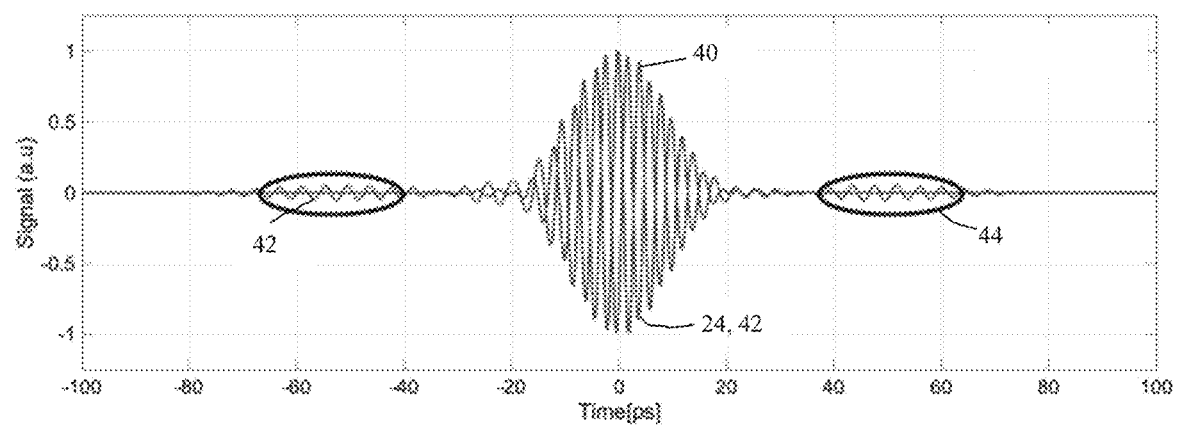
FIGS. 10C and 10D are comparisons of the pulse width between the undispersed pulse of FIG. 10B and the dispersed pulse after compensation by the Silicon and PTFE cohorts, respectively.
Figure 10D:
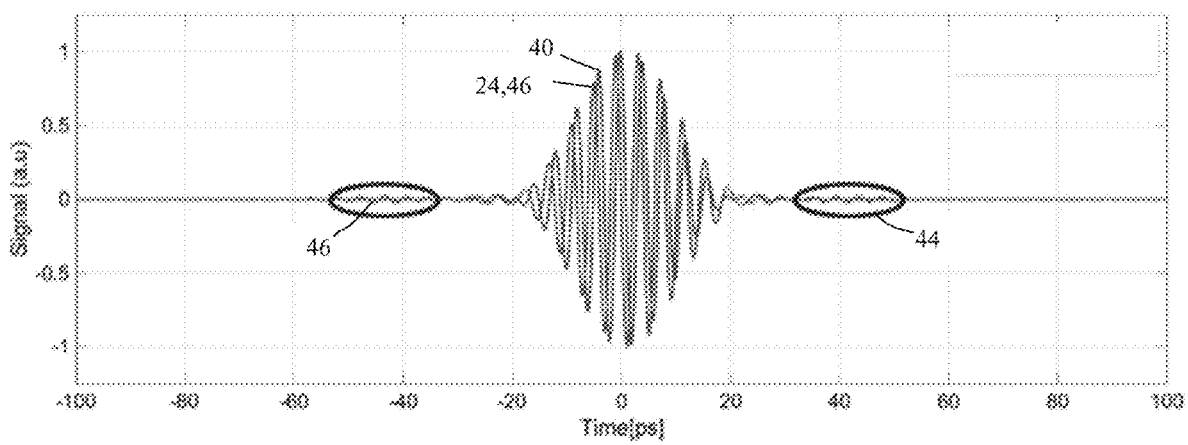

It is worth noting that the missing ~1% of possible compensation for the Si-based cohort is manifested in the presence of "auxiliary pulses" 44 on the compensated waveforms of FIG. 10A (and FIGS. 10C and 10D). These auxiliary pulses 44 contain very little power and are not large enough to significantly contribute to ISI. Their presence may be linked back to the frequency-dependent oscillations in the cohort's group delay around the target group delay (see FIG. 8). In other words, the auxiliary pulses 44 result from the non-zero derivative of the sum of group delays of the atmosphere and the DDC structures. The auxiliary pulses can be minimized by using a lower index material (such as PTFE) to construct the DDC structures. This reduces the lifetime of resonances within layers 16, thus reducing the amplitude of the group delay oscillations. For example, both the group delay oscillations (FIGS. 8 and 9) and the auxiliary pulses 44 (FIG. 10A) are much smaller in the PTFE-cohort than in the Si-cohort. Auxiliary pulses 44 may also be suppressed by the addition of more layers to the DDC structures, or by the addition of more DDC structures to the cohort. In the field, for longer range systems, such strategies might be employed with Si-based DDC structures to obtain every advantage in both optimized dispersion compensation and low loss.

1.3 Experimental Validation.

Figure 12A:
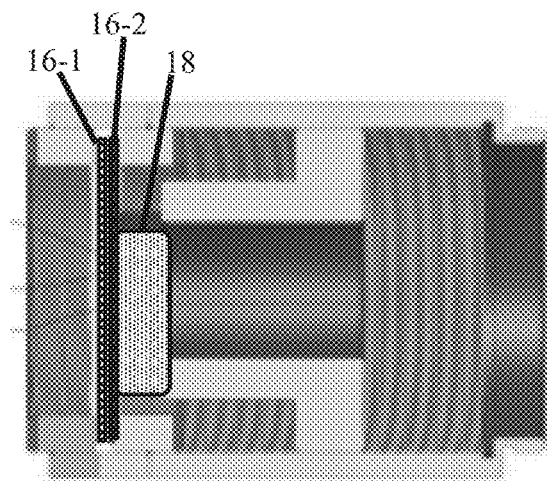
FIGS. 12A-12C are various views of an example fabricated device according to one of the examples in the present disclosure.
Figure 12B:
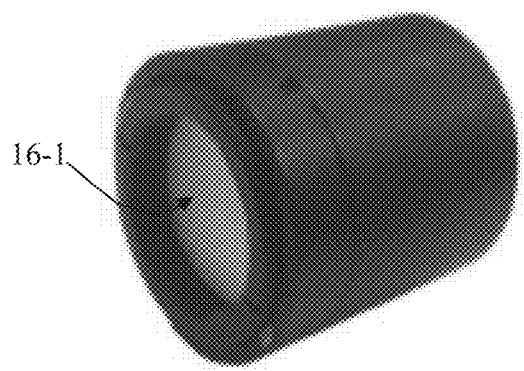
Figure 12C:
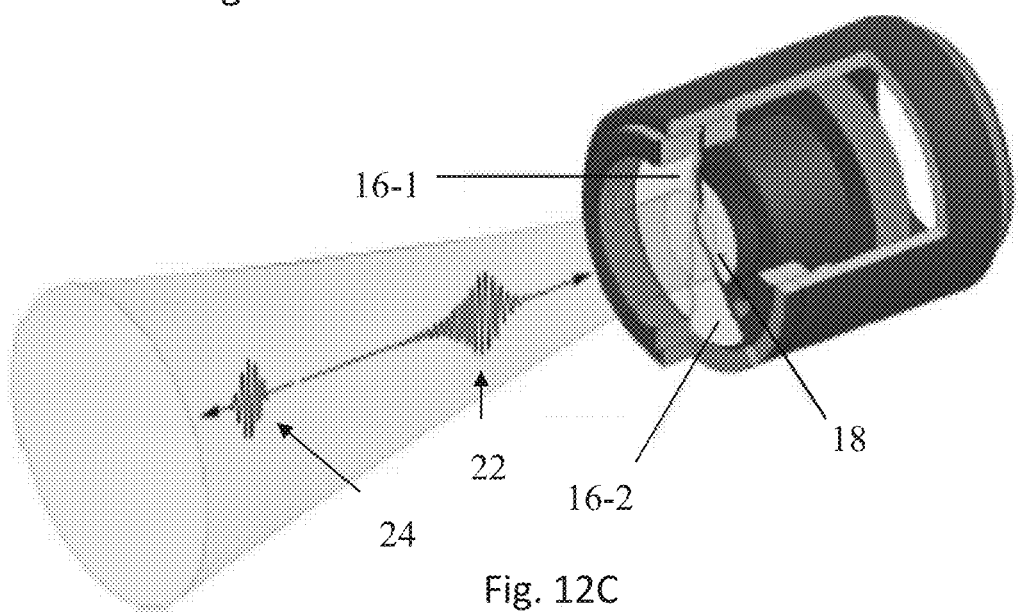

The analytic calculations were supported by both full wave simulations and experimental measurements, the latter detailed here. It was not possible to experimentally implement a 4 km channel with uniform and tuned atmospheric properties. But the absorptive and dispersive behaviors of the atmosphere are already well-understood in great detail and the models have been verified by experimentation. Accordingly, this portion of the example demonstrates than a DDC structure 10 can produce the target "atmospheric opposite" group delay in the bandwidth of interest. One DDC structure of the PTFE-cohort described above was fabricated and measured with reflection-mode terahertz time-domain spectroscopy (THz-TDS). This DDC structure has an ideal structure of 480 µm of PTFE, 380 µm of air, 510 µm of PTFE, 250 µm of air, and finally an aluminum mirror (as backing layer 18). FIG. 12B illustrates an example fabricated device alongside a schematic of its inner structure in FIG. 12C. The DDC structure diameter was made large enough (~12 mm) to avoid clipping the THz beam focused onto its surface. Further fabrication and measurement details are given in the methods section (Section 1.5) below.

Figure 13:
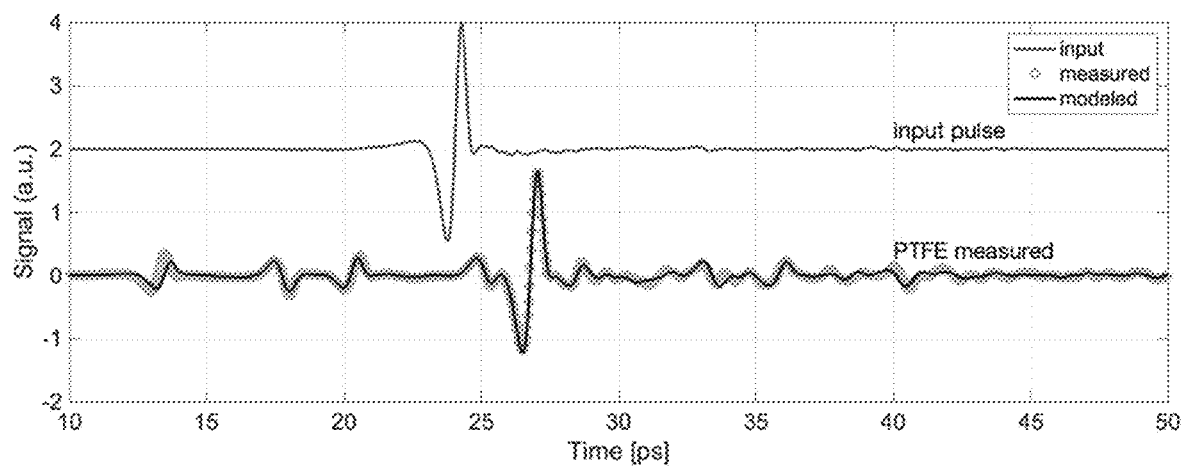
FIG. 13 is a plot illustrating the comparison between the measured and predicted time-domain reflections of the incident THz pulse from the example device depicted in FIG. 12B.

The measured and predicted time-domain traces are shown in FIG. 13. This match is presented in the time-domain to better illustrate that the waveforms are nearly identical. This shows that the DDC structure 10 is behaving almost exactly like the model over the entire measured frequency range (0.1-2.5 THz), both in phase and amplitude. A notable discrepancy between the measured and predicted waveforms is found at the earliest (leftmost) feature on the plot of FIG. 13. This feature is the reflection off the first PTFE layer of the DDC structure, and its slight time misalignment suggests that this layer was fabricated thinner than intended.

Figure 14:
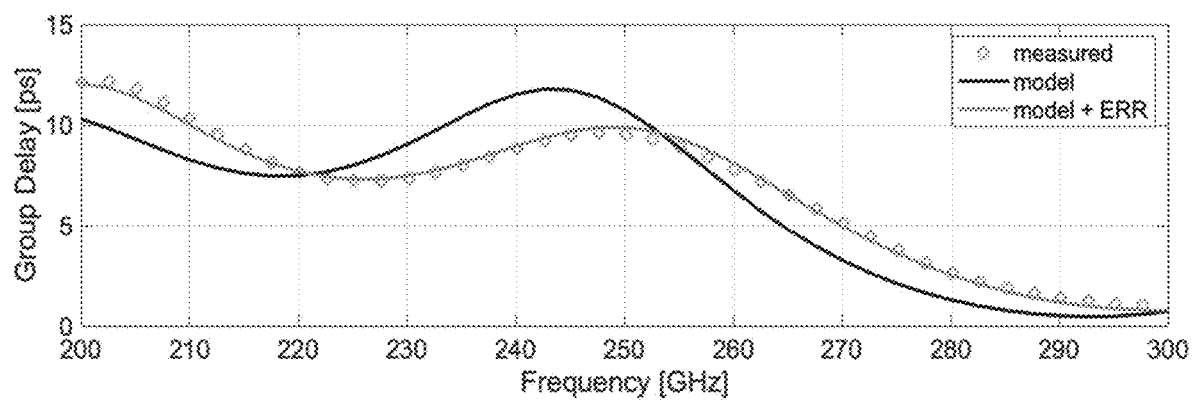
FIG. 14 is a plot illustrating the comparison between the measured (including accounting for fabrication errors) and predicted group delay for the THz waves reflected from the example device depicted in FIG. 12B.

The measured data can be analyzed in the frequency domain to extract the group delay and compare to model predictions, as shown in FIG. 14. Again, there is good agreement between the modeled and measured values, which confirms both the analytical calculations and the validity of the GVD compensation techniques described in the present disclosure. Note that these curves represent the effect of only one reflection from one DDC structure 10 of the cohort 28, hence the graphs of FIGS. 9 and 14 are different. Discrepancies between measured and predicted results arise primarily because the fabrication techniques could not exactly produce the desired layer thicknesses nor uniformity. Specifically, the first PTFE layer 16 appears to have been fabricated as 450 µm, or 30 µm thinner than intended. When the model is modified to account for this error, the predicted and measured group delay profiles are in excellent agreement, as shown by the trace labeled "Modeled+ERR" in FIG. 14. The experimental results confirm the accuracy of the analytic calculations.

1.4 Discussion.

Since the THz wireless channel would generally be dynamic, both in terms of atmospheric properties (weather) and signal range, adaptability to changing channel conditions is addressed and discussed. The dispersion of cohort 28 can be dynamically adapted by altering the number of times the THz beam is reflected from it. For example, by mechanically adjusting the angle and position of the individual cohort members, i.e. DDC structures 10, the dispersed signal 22 can be made to undergo more or fewer reflections from each DDC structure 10 as desired, which corresponds to a discrete increase or decrease in the level of dispersion achieved. By using a low-index dielectric DDC structure 10 in the cohort 28, the resolution of these discrete changes can be very fine, making it possible to compensate effectively a continuous range of changing atmospheric conditions and ranges. Even though changing the number of reflections would be a slow tuning procedure, it is more than sufficient for this application because channel conditions (e.g. weather) also change quite slowly.

Figure 11:
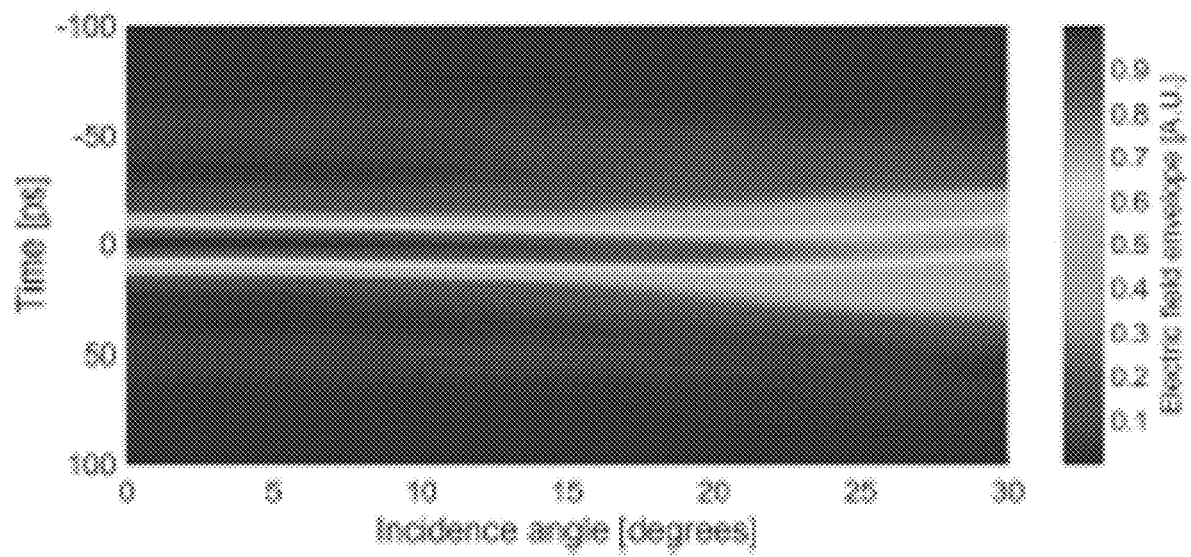
FIG. 11 illustrations a time-domain compensated THz pulse evolution as a function of incidence angle on an example silicon cohort assuming p-polarization.

Altering the physical geometry of the signal path to either add or reduce reflections will also mean changing the angle at which the wave is incident on each DDC structure 10. However, the complex reflection coefficient of a stratified dielectric is a function of incidence angle and polarization. Thus, there is a limit to how obliquely the signal may strike each DDC structure 10 before the cohort 28 will no longer adequately compensate the atmospheric dispersion. For example, calculations show that the silicon cohort described above will still achieve 90% or greater of the possible dispersion compensation as long as the incidence angle for all DDC structures is less than 15 degrees off from normal in either direction, for both s and p polarizations. This is sufficiently flexible for the mechanical tuning techniques described above, and it also illustrates the excellent robustness of the technique to practical alignment errors. The dependence of compensated pulse shape on incidence angle for the Si-cohort is shown in FIG. 11 for a p-polarized (worst case) incident pulse. FIG. 11 illustrates a time-domain compensated THz pulse evolution as a function of incidence angle on the Si-cohort, assuming p-polarization. Unlike FIG. 10A, the normalized envelope of the electric field is shown for clarity. The pulse begins to noticeably disperse in time when the obliquity angle exceeds 15 degrees.

One of many attributes of the described DDC structure 10 is that its effectiveness does not depend on the form or modulation of the incident THz signal. Though the figures and analyses show the dispersion and subsequent compensation of transform-limited pulses (as would be used in impulse radio), continuous-wave modulation schemes such as quadrature amplitude modulation (QAM) and frequency-shift keying will suffer dispersion in like manner, and will be compensated with the same effectiveness. This is because GVD is a function of channel properties only. Regardless of modulation, any THz signal with a given bandwidth, having suffered dispersion in the atmosphere, will be compensated by interacting with a device, like the described DDC structure 10 or a cohort 28 of DDC structures 10 exhibiting a group velocity dispersion opposite the atmosphere over that same bandwidth.

The present example illustrates effective methods and devices for compensating atmospheric dispersion in long-distance THz wireless links to thereby maximize data transmission rates to their fundamental limit. This work represents a step toward the implementation of point-to-point and point-to-mobile THz wireless links. Furthermore, compensating devices such as the ones presented here are highly effective in terms of both complete dispersion management and low loss, are inexpensive to fabricate, and are surprisingly tolerant to manufacturing errors. Though not discussed in this example, the DDC structures and cohorts may also be optimized for oblique incidence, which allows for flexibility in how such devices are physically incorporated into THz communication systems.

1.5 Methods.

Atmospheric modeling. The atmosphere was modeled using molecular response theory (MRT), in conjunction with molecular resonance data from the HITRAN database. For each water vapor molecular resonance in the database, the frequency, resonance strength, and broadening factor was extracted. Resonances too weak or too far distant to influence the frequency range of interest were ignored. MRT was used to model the broadened lineshapes of the remaining resonances. MRT, rather than van-Vleck-Weisskopf or Full Lorentzian models, is used to model the broadened resonance lineshapes because MRT produces a superior match to experimental data. The exact shape of the broadened resonance lines produced by the MRT model depends heavily on the temperature, pressure, and water vapor density of the atmosphere, so these parameters are specified before modeling. After the broadened lineshapes are determined, they are summed up over the frequency range of interest to produce the frequency-dependent transfer function of the atmosphere. Finally, multiplying the transfer function of the atmosphere by the Fourier transform of the input waveform (which is assumed to be a plane wave) yields the frequency-domain representation of the dispersed waveform. Converting this back to the time domain gives the dispersed pulse.

Figure 15:
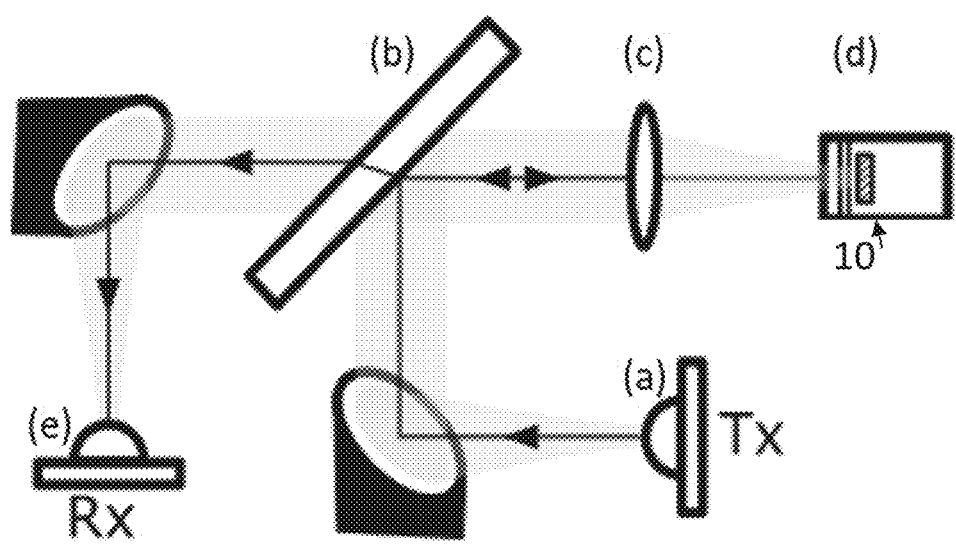
FIG. 15 is an example schematic of a reflection-mode THz-TDS system.

Experimental setup. The reflection-mode THz-TDS setup permits phase-coherent measurements of the sample and reference at normal incidence and is illustrated in FIG. 15. It is modified from the standard transmission setup described in van Exter, M. & Grischkowsky, D. R. Characterization of an optoelectronic terahertz beam system. IEEE Transactions on Microwave Theory and Techniques 38, 1684-1691 (1990), which is incorporated herein in its entirety. Generated terahertz pulses are collimated by an off-axis paraboloidal mirror to a 3 mm thick high-resistivity float-zone silicon beamsplitter (b). From here, they are reflected toward and focused onto the sample (d) at normal incidence using a polyethylene lens (c). At the sample (d), the frequency-independent beam waist diameter is ~7 mm. After reflecting off the sample, the broadband beam is again collimated by the polyethylene lens (c) and then passes through the beamsplitter (b). It is finally focused into the THz receiver (e) by another off-axis paraboloidal mirror. The entire system is confocal to maximize power transfer and ensure a frequency-independent beam waist at the sample.

The thickness of the silicon beamsplitter is chosen to be large so that the initial pulse and subsequent features in the time-domain are easily separable from later echo pulses, which are caused by multiple reflections within the beamsplitter. If the beamsplitter is too thin, the time-domain features introduced by the sample will overlap with the features introduced by the beamsplitter, significantly increasing the difficulty of extracting the sample parameters. Obtaining the transfer function of the DDC structure requires knowledge of the spectrum of the incident wave. The incident wave is measured by removing the two PTFE layers 16 in front and measuring only the aluminum mirror (backing layer 18) of the DDC structure 10 sample. The DDC structure is mounted such that the backing layer mirror does not move when the PTFE layers are added between sample and reference measurements, thus establishing a fixed phase reference for proper determination of the transfer function.

Sample fabrication. The sample was constructed from 20 mm diameter PTFE sheets, manually spaced using the apparatus shown in FIGS. 12A-12C. PTFE sheets of the desired thicknesses were not commercially available, and had to be fabricated by hand. Consequently, though the fabricated layer thicknesses and spacings were close to the intended values, the thickness of the layers and spacings were not ideal. All layers were within the ±5 µm tolerance, with the exception of the first PTFE layer, which measurements indicated was about 30 µm thinner than intended. According to numerical analyses, these fabrication errors—with the exception of the first layer—are small enough to not significantly affect the group delay profile of the sample.

Example 2. Correction of Channel Dispersion in Terahertz Wireless Communications 2.1 Introduction.

The high frequencies and high bandwidth of terahertz systems presents a unique set of challenges, in areas ranging from amplifier design to signal processing to channel modeling of atmospheric effects, the latter being the concern of this example. The atmosphere inhibits point-to-point THz links via two primary mechanisms: absorption and group velocity dispersion (GVD), which arise primarily from effects on the amplitude and phase of the signal respectively. Of these two, absorption has been the most studied by far, and the interested reader is referred to the literature. GVD, on the other hand, has been only sparsely studied. Despite this, it has already been demonstrated that GVD in THz communications is non-negligible, and that in realistically achievable THz links GVD, and not attenuation, will be the limiting factor on data rate. This example illustrates a non-limiting approach for compensating GVD in high-bandwidth wireless communication channels. A dynamically tunable dispersion compensating device is disclosed in this example. This approach is able to achieve up to 99% of the maximum theoretical compensation in an ideal operating scenario over the 200-300 GHz channel, exhibits no latency, is passive, and has an insertion loss as low as 0.07 dB.

2.2 Background.

The rotational resonances of atmospheric water vapor are very strong at THz frequencies, much more so than in the microwave regime. This introduces frequency dependence into the refractive index of the atmosphere, such that differing frequencies of radiation will propagate at different speeds through the channel. The difference in propagation speeds is negligible for narrowband systems, however, the bandwidths that are employed in THz communication links are massive, spanning up to 180 GHz depending on which THz channel is used. Consequently, some signal components will arrive at the receiver before others. This effect is GVD, and it presents an emerging challenge as THz links increase both their transmission distance and their bandwidth. GVD causes the transmitted data symbols to temporally spread beyond their assigned time slot and interfere with neighboring symbols, which causes bit errors in a phenomenon known as intersymbol interference (ISI).

GVD-induced ISI has, up to this point in time, been insignificant in wireless communication due to the narrow bandwidth used in microwave communication technology, and even in the THz links demonstrated to date. However, GVD is a well-known issue in optical communication links, which have a much higher bandwidth. As THz technology progresses toward higher bandwidths at greater distances, GVD will become an issue that must be addressed. For example, future high-bandwidth THz communication links should be treated more like optical links than microwave links, due to their potential to suffer GVD-induced bit errors. These GVD-induced bit-errors can be mitigated by appending error-correction codes to the transmitted data (in other words, sending additional data), by decreasing the bandwidth (sending data more slowly), or by compensating GVD to eliminate or substantially eliminate ISI.

GVD-induced ISI is most clear and intuitive when observed in an impulse-radio-type modulation (in which transform-limited pulses visibly broaden to produce ISI, as pictured in FIG. 1. As mentioned in Example 1, other modulation schemes such as quadrature phase shift keying (QPSK) and 16-QAM are equally impacted by GVD. FIG. 1 illustrates how GVD can corrupt a data sequence, superseding absorption as the limiting factor on achievable data rate. In FIG. 1, the 4 km channel would attenuate the electric field by 7 times (16.9 dB power attenuation), which could be overcome with high-gain antennas and sufficient transmitter power. However, the ISI caused by GVD renders the 4 km link inoperable regardless of how strong the received signal may be. Without dispersion compensation, the only way to avoid GVD-induced ISI is to either reduce the bandwidth of the link, or to reduce the distance between the transmitter and receiver. This illustrates a case where GVD, not attenuation, sets the fundamental limitation on bit-error rate, which is the ultimate concern in digital wireless communication.

To reverse atmospheric dispersion, the proper phase relation between the frequency components needs to be restored. This phase relationship between frequency components can be restored by inserting DDC structure 10 (or cohort 28) with a group delay profile substantially opposite to the atmosphere into the signal path. If the sum of the GVDs of the inserted DDC structure 10 or cohort 28 and the atmosphere is zero (or approaches zero), then the relative phase shifts of the atmosphere and the device will cancel one another, and restore the original phase relation of the signal.

2.3 Results.

A DDC structure for operation at THz frequencies was fabricated for this example. DDC structure 10 included a plurality of layers 16, for example, dielectric strata, arranged in front of backing layer 18, for example, a reflective metal backing, as shown in FIGS. 4, 5A, and 5B. DDC structure 10 operation is somewhat similar in principle to Gires-Tournois interferometers for optical devices. Gires-Tournois interferometers consist of a partial reflector and a complete reflector separated by a resonant cavity. Gires-Tournois interferometers exhibit frequency-dependent group delay because of trapping of radiation within the resonant cavity, whose optical length depends on wavelength. Surprisingly, when the partial reflector is replaced by dielectric strata of differing refractive index, each dielectric interface becomes a partially reflecting surface, and Gires-Tournois-interferometer-like behavior is still observed. However, with DDC structure 10, the presence of multiple reflecting surfaces results in a more complex and tunable dependence of group delay on frequency.

The resonant trapping of the signal between dielectric interfaces (e.g., layers 16-1-16-N) produces strong oscillations in group delay over frequency. These oscillations are considered undesirable in optical dispersion compensation (for example, in double-chirped mirror design, where extensive effort is taken to avoid them). However, the optical thickness and refractive index of layers 16-1-16-N can be finely tuned so that these group delay ripples combine to provide desired anomalous dispersion over the design bandwidth.

In THz wireless, anomalous dispersion is desirable, but by itself is not enough to compensate atmospheric dispersion. The group delay profile of DDC structure 10 (or cohort 28) is also configured to match the atmospheric opposite as closely as possible. The dielectric strata were modeled using characteristic matrices and the optical thickness of each layer was optimized using a custom genetic algorithm, which minimized the root mean squared error between the group delay profile of the fabricated DDC structures 10 and the 'target' group delay profile, i.e., the atmospheric opposite for a particular set of temperature, vapor density, and pressure. Although fair matching to the target group delay profile was obtained for a single DDC structure 10, it was found that reflecting the dispersed signal 22 from multiple DDC structures 10 with complementary group delay profiles in series (a cohort 28) could produce a much more precise match to the target profile and extend the bandwidth of operation. FIG. 5B illustrates a generic cohort 28 of two DDC structures 10-1 and 10-2.

Figure 16:
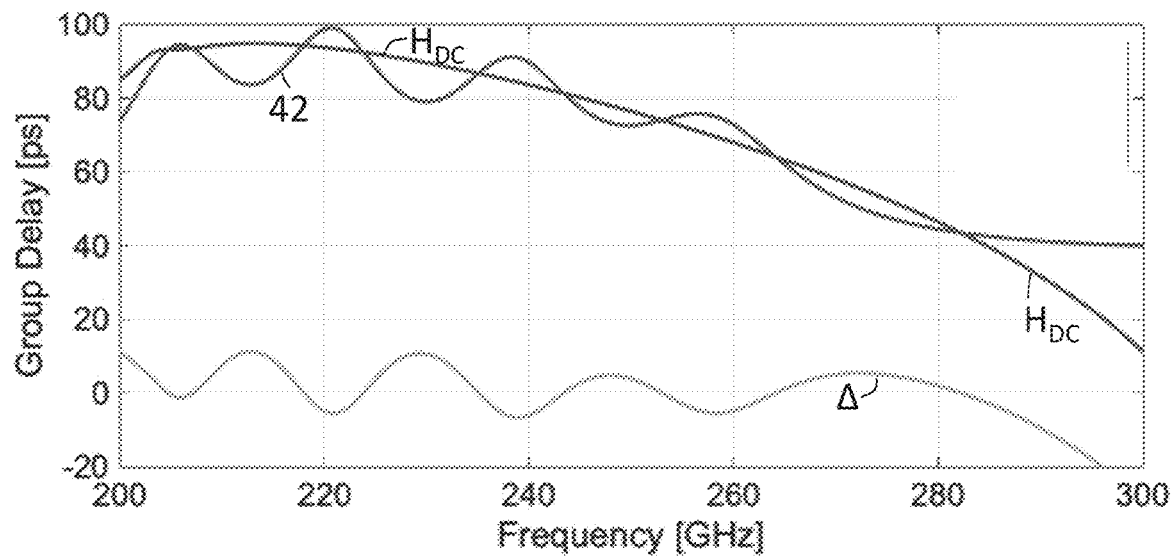
FIGS. 16 and 17 are plots of the predicted performance of a 2-member Si-cohort and PTFE-cohort, respectively, illustrating the group delay profile compared to the ideal group delay profile and the group delay profile of the compensated signal.

For purposes of this example, the generic cohort 28 of FIG. 5B was configured to compensate the dispersion incurred by a 250 GHz center frequency THz signal propagating for 4 km through an atmosphere with uniform water vapor density $\rho_{wv}$=10.37 g/m$^3$ (60% relative humidity at 20° C.), and possessing a bandwidth of 100 GHz. The curve labeled $H_{DC}$ in FIG. 16 shows the ideal group delay profile for compensating this dispersion. The figure also shows the match obtained using the cohort of two DDC structures, made of alternating layers of high-resistivity silicon (Si) and air, which have indices of refraction of $n_{Si}$=3.418 and $n_{air}$=1 respectively. The optimal thicknesses for each of the dielectric layers 16-1-16-N are shown in Table 2 for both DDC structures 10 of the cohort 28 to compensate the dispersion produced by propagation through 4 km of atmosphere with a water vapor density of $\rho_{wv}$=10.37 g/m$^3$ at 20° C.

TABLE 2

| Silicon Cohort | Layer 1 depth (material: silicon) | Layer 2 depth (material:air) | Layer 3 depth (material: silicon) | Layer 4 depth (material:air) |
| --- | --- | --- | --- | --- |
| DDC 10-1 | 190 μm | 760 μm | 210 μm | 250 μm |
| DDC 10-2 | 210 μm | 800 μm | 260 μm | 90 μm |

Variations in thickness of ±5 μm (micrometers) produced negligible changes in the performance of the device. In operation, an incident THz signal 22 would be reflected once from each DDC structure 10 to counteract atmospheric group velocity dispersion. As seen in FIG. 16 the cohort is well matched to the target group delay profile. The group delay difference between the ideal and realized design, labeled A in FIG. 16, is flat on average, which indicates the correction of GVD, since total GVD is proportional to the slope of this difference. The Si-cohort has a minimum power reflectivity of over 98%, with the majority loss mechanism being conductor losses in the reflective metal backing.

Figure 17:
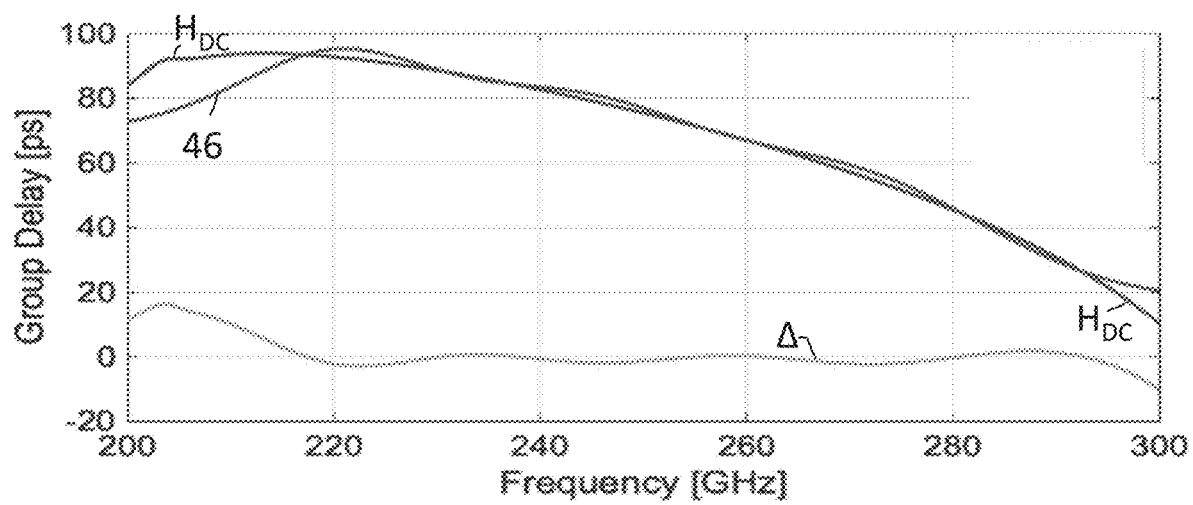

A cohort of two DDC structures using alternating layers of polytetrafluoroethylene (PTFE) and air as the dielectrics was also designed to compensate the same amount of dispersion (i.e., dispersion produced by propagation through 4 km of atmosphere with a water vapor density of $\rho_{wv}$=10.37 g/m³ at 20° C.). The lossy index of PTFE of $n_{PTFE}$=1.42+ i0.0032 was obtained by terahertz time-domain spectroscopic characterization, and the ideal layer thicknesses of the dielectric layers are given in Table 3. Since PTFE's index of refraction is lower than that of silicon, the lifetime of the resonances within the cavities of the DDC structures are reduced, and the THz signal correspondingly experiences less dispersion. This allowed a much more precise match to the atmosphere's dispersion profile at the expense of total anomalous dispersion experienced by the signal, as shown in FIG. 17. The very flat Δ plot in FIG. 17 reveals an excellent compensation of GVD.

TABLE 3

| PTFE Cohort | Layer 1 depth (material:PTFE) | Layer 2 depth (material:air) | Layer 3 depth (material:PTFE) | Layer 4 depth (material:air) |
| --- | --- | --- | --- | --- |
| DDC 10-1 | 480 μm | 380 μm | 510 μm | 250 μm |
| DDC 10-2 | 430 μm | 750 μm | 540 μm | 290 μm |

Another trade-off encountered when using PTFE as the dielectric is the increase of absorptive losses. PTFE exhibits low loss in the band of interest, but the small losses are magnified by the fact that the incident THz signal must resonate within the layers of the DDC structure, meaning the PTFE layers are traversed multiple times. Losses are further amplified by the fact that the PTFE cohort requires the incident signal to make multiple reflections from each mirror (e.g., 4 reflections, for a 4 km channel). This leads to a much larger insertion loss than for a silicon-based cohort, and both material and reflector losses need to be accounted for in a PTFE-based cohort. Even so, the cohort of two PTFE DDCs is predicted to reflect more 55% of the incident power (2.6 dB insertion loss) for a signal taking four passes through the cohort.

Although FIGS. 16 and 17 show good matching to the target group delay curvature, it is instructive to also examine the predicted performance of the cohorts in the time domain. A transform-limited pulse centered at 250 GHz was given a raised cosine spectrum with a full-width-half-max (FWHM) bandwidth of 50 GHz, and dispersed by plane-wave propagation through 4 km of atmosphere with $\rho_{wv}$=10.37 g/m³ and temperature T=20° C. The pulse broadened by GVD to 175% of its original width and attenuated by a factor of 9.1 times by water vapor absorption. This reflection of this pulse from both the Si- and PTFE-based MGTI cohorts was simulated, with the pulse reflecting either once (Si) or four (PTFE), times at normal-incidence from each DDC structure in the respective cohort. The pre- and post-atmosphere waveforms are shown in FIG. 10B and labeled as 40 and 22, respectively. The pre- and post-atmosphere waveforms are also shown in the upper two plots of FIG. 10A. The compensation 24 of the dispersed pulse 22 by the Si and PTFE cohorts is shown in FIGS. 10C and 10D respectively and also in the lower two waveforms of FIG. 10A with the Si and PTFE waveforms labeled as 42 and 46, respectively. In FIGS. 10C and 10D the compensated pulses, 24, 42 and 24, 46, respectively, have been scaled up seven times in amplitude to aid in pulse width comparison to the original pulse 40.

When the dispersed pulse 22 was compensated by both Si and PTFE cohorts, the pulse width was reduced from 175% to 105% that of the original pulse by dispersion compensation, which is over 99% of the compensation theoretically possible. In FIG. 10A (lower two waveforms) and FIGS. 10C and 10D, "auxiliary pulses" 44 are identified. Auxiliary pulses 44 have very low power, will not contribute significantly to ISI, and are a result of the variations of the cohort group delay about the desired atmospheric opposite (for example, see FIG. 16). The magnitude of the variations—and subsequently the strength of the auxiliary pulses 44—is reduced in the PTFE cohort (FIG. 10D), due to the lower index of PTFE as compared to Si. The lower index of PTFE reduces both the strength and the lifetime of the resonances within the DDC structures, which enables it to obtain a better match to the atmospheric opposite and suppress the auxiliary pulses 44.

2.4 Experimental validation.

It was not possible for to implement a 4 km THz channel with uniform and tunable atmospheric properties, but the models of atmospheric action on THz propagation have already been verified in previous work, and for the purposes of this example, such atmospheric models are assumed to be accurate and reliable. Accordingly, the frequency response of the cohort is reviewed here. With full-wave electromagnetic simulations further supporting the previously described analytic results, one DDC structure of the PTFE-cohort described in this example was fabricated and spectroscopically characterized for operation over the 200-300 GHz band with terahertz time-domain spectroscopy (THz-TDS) to determine whether it could produce the desired group delay profile.

The DDC structure selected for characterization was the second DDC structure member of the PTFE cohort, and consisted of four layers of alternating high and low index dielectric (PTFE and air respectively) arranged in front of a highly reflective metal back plate. The ideal layer thicknesses of the DDC structure are given above in Table 3 under the row labeled "DDC 10-2". Commercially available PTFE sheets were thinned appropriately, and mounted with proper spacing in front of an aluminum mirror in the assembly shown in FIG. 12B. Because the thicknesses of the PTFE layers, and the spacing between them, were set manually, the thicknesses of the dielectric strata varied somewhat from the ideal values given in Table 3. All layer thicknesses were within +/−5 μm of the intended values except the first layer, which was measured to be 30 μm thinner than desired. Analytic prediction of device performance indicated that these manufacturing errors would not significantly affect the performance, with the exception of the 1st layer.

The fabricated DDC was characterized using reflection-mode THz-TDS. A schematic of the THz-TDS system is illustrated in FIG. 15. The setup is the same as described above in reference to Example 1 in section 1.5 experimental setup. As described above, the setup was modified to allow samples to be characterized in reflection under normal incidence, allowing phase-coherent measurements of both the sample and reference to be taken. The system is capable of sample characterization from 0.1 to 2 THz, which allows for measuring the 0.2-0.3 THz response of the DDC structure.

The results obtained through experimental measurements validated the behavior of the device predicted by the analytic models. FIG. 13 shows a comparison of the measured and predicted time-domain traces, which show significant similarity. This demonstrates that the analytic model of the DDC structure is a very good predictor of the behavior of the physical DDC structure over the measured bandwidth (0.1-2 THz). The most noticeable difference between the time-domain traces is in the earliest (leftmost) feature of the measured data. This feature is caused by the reflection of the characterization pulse off the first PTFE layer of the DDC structure, and its time misalignment reflects the fact that this layer was fabricated thinner than intended.

The frequency-domain behavior of the fabricated DDC structure was found by taking the Fourier transform of the time-domain sample characterization. In particular, the group delay of the sample was extracted from the measured data by computing the derivative of the phase of the frequency-domain signal. As shown in FIG. 14, comparison between the measured (open circles) and predicted group delays (solid traces of "model" and "model+ERR") shows good agreement, and the difference between the measured and predicted group delay profiles is largely due to the fact that the first PTFE layer was made 30 µm thinner than the ideal value. Accordingly, if the response of the DDC structure is recomputed analytically with the thickness of the first layer of PTFE reduced by 30 the measured group delay (FIG. 14, open circles) becomes very similar to that predicted by the model (see FIG. 14, trace "model+ERR"). Accordingly, these results strongly support the validity of the modeling and the example DDC structures 10 and cohorts 28 are configured to compensate atmospheric channel dispersion at THz frequencies.

The apparatuses and devices described herein can be monolithic or be a plurality of components operably coupled together to achieve the described functionality. Such apparatuses and devices and methods and techniques for making and using the same can be customized as desired for a given target application or end-use.

As demonstrated by this disclosure, including the non-limiting examples, structurally simple, low-cost dispersion-compensating devices are provided to substantially counter and reverse atmospheric dispersion, enabling maximum, low-bit-error data rates in high-bandwidth point-to-point THz links. Assembling DDC structures 10 into a cohort 28 allows increasingly precise matches to the atmospheric group delay profile to be made by adding members (i.e., additional DDC structures 10) to the cohort 28. For example, cohorts 28 fabricated using low-loss dielectrics such as float-zone silicon are efficient. As previously described, structures 10 and cohorts 28 in general can be made from various dielectrics, making them inexpensive to fabricate.

While various aspects, implementations, structures, devices, systems, methods, and techniques for compensating terahertz wireless signals caused by atmospheric dispersion have been described and/or illustrated herein, such descriptions and illustrations are presented by way of example and are not to be limited to the precise descriptions and illustrations. Accordingly, numerous modifications and variations are possible by those skilled in the art without departing from the spirit and scope hereof, as defined by the following and later-submitted claims and their equivalents. The breadth and scope of the present disclosure should not be limited by any of the implementations and illustrations described herein, but should be defined only in accordance with the following and later-submitted claims and their equivalents.

What is claimed is:

1. An apparatus comprising:
a stratified structure having a front end and a back end, the stratified structure comprising a plurality of adjacent dielectric layers of differing refractive indices, wherein each layer has a refractive index different from an immediately adjacent dielectric layer, the stratified structure further including a backing layer at the back end;
the stratified structure defining a group delay dispersion, and the stratified structure is configured to introduce the group delay dispersion to a received wireless terahertz signal and thereby produce a compensated terahertz signal when the received wireless terahertz signal is reflected by the stratified structure.

2. The apparatus of claim 1, wherein resonant trapping of frequencies within the stratified structure introduces a frequency-dependent group delay.

3. The apparatus of claim 1, wherein the group delay dispersion introduced to the received wireless terahertz signal is substantially opposite to a group delay dispersion caused by atmospheric absorption losses in the received wireless terahertz signal.

4. The apparatus of claim 3, wherein data represented by the compensated terahertz signal corresponds to data represented by an initial terahertz signal prior to introduction of atmospheric absorption losses.

5. The apparatus of claim 1, wherein the plurality of dielectric layers are transparent.

6. The apparatus of claim 1, wherein the plurality of dielectric layers are selected from one or more of: silicon, sapphire, quartz polytetrafluoroethylene, polyimide, polystyrene, cyclo-olefin polymer, cyclo-olefin copolymer, polydimethylsiloxane, parylene, low-loss plastic, polyethylene, polymethyl methacrylate, low-loss resin, low-loss glasses, low-loss ceramic, titanium dioxide, oil, air, nitrogen, helium, neon, argon, or combinations of any of the foregoing.

7. The apparatus of claim 1, wherein the plurality of dielectric layers are alternating layers of polytetrafluoroethylene and air.

8. The apparatus of claim 1, wherein the plurality of dielectric layers are alternating layers of silicon and air.

9. The apparatus of claim 1, wherein the backing layer is a reflective metal.

10. The apparatus of claim 9, wherein the reflective metal is selected from the group of aluminum, gold, silver, copper, titanium, nickel, cobalt, chromium, molybdenum, platinum, tungsten, or alloys of any of the foregoing.

11. The apparatus of claim 1, wherein the backing layer is a frequency-selective surface.

12. The apparatus of claim 1, wherein the group delay dispersion of the stratified structure is dynamically tunable.

13. The apparatus of claim 1, wherein a change to a thickness of one or more dielectric layers of the stratified structure thereby changes the group delay dispersion of the stratified structure.

14. The apparatus of claim 13, wherein when one or more dielectric layers is a fluid, the thickness of each dielectric layer of the fluid is about 1 micrometer to about 2,000 micrometers.

15. The apparatus of claim 1, wherein rotation of the stratified structure changes an angle of incidence upon which the received wireless terahertz signal will encounter the stratified structure and thereby changes the group delay dispersion of the stratified structure.

16. The apparatus of claim 1, further comprising a plurality of stratified structures to form a cohort of stratified structures and the plurality of stratified structures are arranged relative to each other to communicate a terahertz signal, and the cohort defines a group delay dispersion of the cohort, and at least one moveable reflective layer, the moveable reflective layer is configured to move from a first position to a second position where the second position blocks the front end of at least one stratified structure in the cohort and thereby change the group delay dispersion of the cohort.

17. The apparatus of claim 16, wherein an angle of incidence for each stratified structure of the cohort is between about 0 degrees and about 90 degrees.

18. The apparatus of claim 17, wherein an angle of incidence for each stratified structure of the cohort is between about 0 degrees and about 45 degrees.

19. The apparatus of claim 16, wherein each of the plurality of stratified structure in the cohort has a different group delay dispersion.

20. The apparatus of claim 16, wherein one or more of the plurality of stratified structures in the cohort have the same group delay dispersion.

21. A method of compensating atmospheric dispersion of a wireless terahertz signal, comprising the steps of:
receiving the wireless terahertz signal by a dynamic dispersion compensator, the wireless terahertz signal having group delay dispersion caused by atmospheric absorption losses, wherein the dynamic dispersion compensator includes: a cohort of a plurality of stratified structures arranged relative to each other to communicate the received wireless terahertz signal, wherein the cohort defines a group delay dispersion of the cohort, and includes at least one moveable reflective layer, wherein each stratified structure of the cohort has a front end and a back end, each stratified structure includes a plurality of adjacent dielectric layers of differing refractive indices, and each dielectric layer has a refractive index different from an immediately adjacent dielectric layer, and each stratified structure includes a backing layer at its back end, and wherein each stratified structure in the cohort defines a group delay dispersion, and wherein the at least one moveable reflective layer of the cohort is configured to move from a first position to a second position where the second position blocks the front end of at least one stratified structure in the cohort and thereby change the group delay dispersion of the cohort; and
reflecting, by the dynamic dispersion compensator, a compensated wireless terahertz signal, wherein data carried by the compensated wireless terahertz signal corresponds to data carried by an initial wireless terahertz signal prior to introduction of the group delay dispersion caused by atmospheric absorption losses.

22. The method of claim 21, further comprising the step of:
dynamically tuning the dynamic dispersion compensator.

23. The method of claim 22, wherein the step of dynamically tuning the dynamic dispersion compensator includes: rotating at least one stratified structure of the cohort to change an angle of incidence upon which the received wireless terahertz signal encounters the cohort and thereby dynamically tune the dynamic dispersion compensator by altering the group delay dispersion of the cohort.

24. The method of claim 22, wherein the step of dynamically tuning the dynamic dispersion compensator includes: positioning one or more reflective layers on the front end of one or more stratified structures of the cohort.

25. The method of claim 22, wherein the step of dynamically tuning the dynamic dispersion compensator includes: adjusting a thickness of one or more dielectric layers of one or more stratified structures of the cohort.

26. The method of claim 22, wherein the step of dynamically tuning the dynamic dispersion compensator includes one or more of: rotating at least one stratified structure of the cohort, positioning a reflective layer on the front end of one or more stratified structures of the cohort, adjusting a thickness of one or more dielectric layers of one or more stratified structures of the cohort, or one or more combinations of any of the foregoing.

27. The method of claim 21, wherein the plurality of dielectric layers are transparent.

28. The method of claim 21, wherein the plurality of dielectric layers are selected from one or more of silicon, sapphire, quartz polytetrafluoroethylene, polyimide, polystyrene, cyclo-olefin polymer, cyclo-olefin copolymer, polydimethylsiloxane, parylene, low-loss plastic, polyethylene, polymethyl methacrylate, low-loss resin, low-loss glasses, low-loss ceramic, titanium dioxide, oil, air, nitrogen, helium, neon, argon, or combinations thereof.

29. The method of claim 21, wherein the backing layer is a reflective metal.

30. The method of claim 29, wherein the reflective metal is selected from the group of aluminum, gold, silver, copper, titanium, nickel, cobalt, chromium, molybdenum, platinum, tungsten, or alloys of any of the foregoing.

31. The method of claim 21, wherein the backing layer is a frequency-selective surface.

32. The method of claim 21, wherein each group delay dispersion for each stratified structure in the cohort is different.

33. The method of claim 21, wherein one or more stratified structures in the cohort have the same group delay dispersion.

34. A dynamic dispersion compensator comprising:
a cohort of a plurality of stratified structures arranged relative to each other to communicate a received wireless terahertz signal, wherein the cohort defines a group delay dispersion of the cohort and the cohort is configured to introduce a group delay dispersion to the received wireless terahertz signal and reflect a compensated terahertz signal, and includes at least one moveable reflective layer, wherein each stratified structure of the cohort includes a front end and a back end, and each stratified structure includes a plurality of adjacent dielectric layers of differing refractive indices, and each dielectric layer has a refractive index different from an immediately adjacent dielectric layer, and each stratified structure includes a backing layer at its back end, wherein each stratified structure in the cohort defines a group delay dispersion for itself, and wherein the at least one moveable reflective layer of the cohort is configured to move from a first position to a second position where the second position blocks the front end of at least one stratified structure in the cohort and thereby change the group delay dispersion of the cohort.

35. The dynamic dispersion compensator of claim 34, wherein the group delay dispersion introduced to the received wireless terahertz signal by the cohort is substantially opposite to a group delay dispersion caused by atmospheric absorption losses in the received wireless terahertz signal.

36. The dynamic dispersion compensator of claim 35, wherein data represented by the compensated terahertz signal corresponds to data represented by an initial terahertz signal prior to introduction of atmospheric dispersion.

37. The dynamic dispersion compensator of claim 34, wherein the plurality of dielectric layers are transparent.

38. The dynamic dispersion compensator of claim 34, wherein the plurality of dielectric layers are selected from one or more of: silicon, sapphire, quartz polytetrafluoroethylene, polyimide, polystyrene, cyclo-olefin polymer, cyclo-olefin copolymer, polydimethylsiloxane, parylene, low-loss plastic, polyethylene, polymethyl methacrylate, low-loss resin, low-loss glasses, low-loss ceramic, titanium dioxide, oil, air, nitrogen, helium, neon, argon, or combinations thereof.

39. The dynamic dispersion compensator of claim 34, wherein the backing layer is a reflective metal.

40. The dynamic dispersion compensator of claim 39, wherein the reflective metal is selected from the group of aluminum, gold, silver, copper, titanium, nickel, cobalt, chromium, molybdenum, platinum, tungsten, or alloys of any of the foregoing.

41. The dynamic dispersion compensator of claim 34, wherein the backing layer is a frequency-selective surface.

42. The dynamic dispersion compensator of claim 34, wherein the group delay dispersion of the cohort is dynamically tunable.

43. The dynamic dispersion compensator of claim 42, wherein the dynamic dispersion compensator is configured such that changing a thickness of one or more dielectric layers of at least one stratified structure of the cohort thereby changes the group delay dispersion of the at least one stratified structure and the cohort.

44. The dynamic dispersion compensator of claim 42, wherein rotation of at least one stratified structure of the cohort changes an angle of incidence upon which the received wireless terahertz signal will encounter the stratified structure.

45. The dynamic dispersion compensator of claim 34, wherein when one or more dielectric layers is a fluid, the thickness of each dielectric layer of the fluid is about 1 micrometer to about 2,000 micrometers.

46. The apparatus of claim 34, wherein an angle of incidence for each stratified structure of the cohort is between about 0 degrees and about 90 degrees.

47. The apparatus of claim 46, wherein the angle of incidence for each stratified structure of the cohort is between about 0 degrees and about 45 degrees.

48. The dynamic dispersion compensator of claim 34, wherein each group delay dispersion for each stratified structure in the cohort is different.

49. The dynamic dispersion compensator of claim 34, wherein one or more stratified structures in the cohort have the same group delay dispersion.

50. An apparatus comprising:
a stratified structure having a front end and a back end, the stratified structure comprising a plurality of adjacent layers of differing refractive indices, wherein each layer has a refractive index different from an immediately adjacent layer, the stratified structure further including a backing layer at the back end;
the stratified structure defining a group delay dispersion, and the stratified structure is configured to introduce the group delay dispersion to a received wireless terahertz signal and thereby produce a compensated terahertz signal when the received wireless terahertz signal is reflected by the stratified structure.

51. The apparatus of claim 50, wherein resonant trapping of frequencies within the stratified structure introduces a frequency-dependent group delay.

52. The apparatus of claim 50, wherein the group delay dispersion introduced to the received wireless terahertz signal is substantially opposite to a group delay dispersion caused by atmospheric absorption losses in the received wireless terahertz signal.

53. The apparatus of claim 50, wherein the backing layer is a frequency-selective surface.

54. The apparatus of claim 50, wherein at least one layer is a frequency-selective surface.

55. The apparatus of claim 50, wherein at least one layer is a frequency-selective surface and at least one layer is a dielectric substrate.

56. The apparatus of claim 55, wherein the backing layer is a frequency-selective surface.

57. The apparatus of claim 50, wherein the group delay dispersion of the stratified structure is dynamically tunable.

58. The apparatus of claim 57, wherein rotation of the stratified structure changes an angle of incidence upon which the received wireless terahertz signal will encounter the stratified structure.

59. The apparatus of claim 58, wherein the angle of incidence for the stratified structure is between about 0 degrees and about 90 degrees.

* * * * *